United States Patent [19]

Matthews et al.

[11] Patent Number: 5,273,019
[45] Date of Patent: Dec. 28, 1993

[54] APPARATUS WITH DYNAMIC PREDICTION OF EGR IN THE INTAKE MANIFOLD

[75] Inventors: Gregory P. Matthews, Bloomfield Hills; Kenneth P. Dudek, Rochester Hills; Charles H. Folkerts, Troy, all of Mich.

[73] Assignee: General Motors Corporation, Detroit, Mich.

[21] Appl. No.: 927,038

[22] Filed: Aug. 10, 1992

Related U.S. Application Data

[63] Continuation-in-part of Ser. No. 804,857, Dec. 6, 1991, which is a continuation-in-part of Ser. No. 653,931, Feb. 12, 1991, which is a continuation-in-part of Ser. No. 618,122, Nov. 26, 1990, abandoned.

[51] Int. Cl.⁵ .......................................... F02M 25/07
[52] U.S. Cl. .................................................. 123/571
[58] Field of Search ............... 123/416, 417, 339, 478, 123/480, 494, 571, 585; 364/431.01, 431.03, 431.04, 431.05, 431.06

[56] References Cited

U.S. PATENT DOCUMENTS

| | | | |
|---|---|---|---|
| 4,173,205 | 11/1979 | Toelle | 123/571 |
| 4,269,156 | 5/1981 | Drellishek | 123/418 |
| 4,386,652 | 6/1983 | Nagaishi | 73/118.2 |
| 4,433,666 | 2/1984 | Masaki | 123/569 |
| 4,437,340 | 3/1984 | Csere et al. | 73/118.2 |
| 4,438,497 | 3/1984 | Willis et al. | 364/431.05 |
| 4,446,523 | 5/1984 | Reinke | 364/431.05 |
| 4,495,917 | 1/1985 | Sawamoto | 123/458 |
| 4,502,325 | 3/1985 | Klomp | 73/118.2 |
| 4,548,185 | 10/1985 | Pozniak | 123/571 |
| 4,599,694 | 7/1986 | Aposchanski | 364/431.05 |
| 4,644,474 | 1/1987 | Aposchanski | 364/431.05 |
| 4,664,090 | 5/1987 | Kabasin | 123/494 |
| 4,705,009 | 11/1987 | Asayama | 123/571 X |
| 4,750,352 | 6/1988 | Kolhoff | 73/117.3 |
| 4,761,994 | 8/1988 | Sogawa | 73/118.2 |
| 4,823,760 | 4/1989 | Nishida | 123/571 |
| 4,860,222 | 8/1989 | Schmidt et al. | 364/550 |
| 4,893,244 | 1/1990 | Tang et al. | 364/431.03 |
| 4,969,439 | 11/1990 | Scotson | 123/419 |
| 4,986,243 | 1/1991 | Weissler, II et al. | 123/488 |
| 4,987,888 | 1/1991 | Funabashi et al. | 123/488 |
| 5,041,981 | 8/1991 | Sekozawa et al. | 364/431.05 |
| 5,051,909 | 9/1991 | Gomez et al. | 365/431.05 |
| 5,094,213 | 3/1992 | Dudek et al. | 123/478 |
| 5,205,260 | 4/1993 | Takahashi et al. | 123/571 X |

OTHER PUBLICATIONS

L. L. Bowler, *Throttle Body Fuel Injection (TBI)—An Integrated Engine Control system*, Int. J. of Vehicle Design, Special Pub., SP4, Jan. 1983; pp. 169–186.

J. F. Schweikert, *Adaptive Electronic EGR System Development: Total Charge Dilution*, APMES Presentation, Sep. 12, 1983.

R. L. Brook and G. C. Arnold, *Applied Regression Analysis and Experimental Design*, N.Y. Marcel Dekker, Jan. 1985; pp. 1–29.

C. F. Taylor, *The Internal Combustion Engine, vol. 1; Thermodynamics Fluid Flow Performance*, The MIT Press, Jan. 1960, pp. 503–509.

K. J. Astrom and B. Wittenmark, *Computer Controlled Systems Theory and Design*, Prentice-Hall, Englewood, N.J., 1984; pp. 36–39 and 268–271, Jan. 1984.

B. Anderson and J. B. Moore, *Optimal Filtering*, Prentice Hall, Jan. 1979; pp. 111–115.

Automotive Engine Control: A Linear Quadratic Approach by James Brian Lewis, Jul. 1980.

*Primary Examiner*—Willis R. Wolfe
*Attorney, Agent, or Firm*—Anthony L. Simon

[57] ABSTRACT

A method and apparatus disclosed provide dynamic prediction of re-circulated exhaust gas content in an engine intake manifold. An engine-controller combination, comprises a vehicle engine and an exhaust gas re-circulation valve providing re-circulation of engine exhaust gas. Several sensors determine measures of a set of engine parameters and provide measurement signals indicative of the measures. A microprocessor control unit receives the measurement signals, (ii) predicts future values of MAP and $P_o$, where MAP represents an absolute pressure of an engine intake manifold and where $P_o$ represents a new air partial pressure of the engine intake manifold, and (iii) controls the vehicle engine in response to the predicted future values of MAP and $P_o$.

26 Claims, 8 Drawing Sheets

APPARATUS WITH DYNAMIC PREDICTION OF EGR IN THE INTAKE MANIFOLD

This application is a continuation-in-part of U.S. patent application, Ser. No. 804,857, filed Dec. 6, 1991, still pending, which is a continuation-in-part of U.S. patent application, Ser. No. 653,931, filed Feb. 12, 1991, still pending which is a continuation-in-part of U.S. patent application, Ser. No. 618,122, filed Nov. 26, 1990, now abandoned. This application is also related to U.S. Pat. Nos. 5,070,846, issued Dec. 10, 1991 and 5,094,213, issued Mar. 10, 1992. All of the above mentioned applications and patents are assigned to the assignee of this invention and the disclosures, of which, are incorporated herein by reference.

This invention relates to engine controllers and more particularly to engine controllers incorporating state prediction.

BACKGROUND OF THE INVENTION

The air-fuel ratio in an internal combustion engine affects both engine emissions and performance. With strict modern emissions standards for automobiles, it is necessary to accurately control the air-fuel ratio of the automobile engine, requiring precise measurement of the mass air flow into the engine.

Currently, engine air flow is either measured with a mass air flow sensor or calculated by the speed-density method. Improvements in both types for systems have lead to improved air-fuel ratio control of engines, enabling vehicle manufacturers to meet existing emissions standards.

To achieve yet further improvements on air-fuel ratio control, more engine variables need to be taken into account. An example of a variable that affects emissions output is the amount of REG (re-circulated exhaust gas) in the intake manifold. Mass air flow sensors measure only new air introduced to the manifold and not REG. Suitable sensors that measure REG are not yet available.

System do exist for estimating the amount of REG in a manifold during steady-state conditions based on measured new mass air flow and manifold pressure. However, no system exists for accurately estimating the amount of REG in the manifold during transient (non-steady-state) conditions.

In an ideal engine control system, sensor processing and fuel delivery occur instantaneously to allow precise air-fuel ratio control. In reality, however, it takes a finite amount of time to process sensor measurements to compute proper fueling and a finite amount of time to physically deliver the fuel. The delays in the fuel computation and delivery force the fuel control system to compute the fuel to be delivered in a particular cylinder before the actual delivery of the fuel.

For example, in speed-density systems, air flow estimates are based on measurements of manifold absolute pressure. The aforementioned delays force speed-density systems to read manifold absolute pressure prior to the theoretically optimal time, which would be during the intake event for the cylinder to be fueled. A typical value for this delay is two to three engine events. Because of the dynamic characteristics of engines, the manifold absolute pressure, air flow and REG, can change dramatically between the time manifold absolute pressure is read (and the fuel computed) and the intake event for the cylinder being fueled. Therefore the delay between the calculated air flow and the actual air flow into the cylinder is prominent.

At other times, however, due to parameters such as manifold volume, sensor time constant, etc., the calculated air flow actually leads the actual air flow into the engine. Speed-density calculations are most accurate during static situations. During dynamic situations, when the mass air flow into the engine is changing, the calculated mass air flow into the engine may lead or lag the actual mass air flow. This increases the difficulty of properly controlling the air-fuel ratio during transient conditions.

What is desired is a method of achieving increased accuracy in the determination of proper air-fuel ratio for the vehicle engine in vehicles while taking into account REG in the intake manifold to enable vehicle manufacturers to meet increasingly tightening emissions standards.

SUMMARY OF THE PRESENT INVENTION

This invention provides increased accuracy in engine air/fuel delivery systems by using accurate predictions of manifold absolute pressure (MAP) and REG in the manifold for the time air and fuel actually enter the engine, whether the engine is in steady state or transient (dynamic or non-steady-state) conditions. Implementation of this invention enables increased accuracy in calculations of proper fuel distribution so that the proper air-fuel ratio at the time of actual combustion can be achieved. Additionally, the method and apparatus of this invention can be used to control engine spark timing, engine idle air flow, engine idle speed, engine speed and transmission gear selection for electronically controlled transmissions.

This invention provides model-based prediction and measurement-based correction (estimation) of manifold absolute pressure (MAP) and the prediction of manifold absolute pressure that would occur if no REG were in the intake manifold ($P_o$, also referred to below as new air partial pressure). The number of engine events in the future for which the prediction is made may vary from system to system (note that in this specification engine event is used as the time variable, e.g., two engine events in the future refers to two time events in the future). The predictions of MAP and $P_o$ are together used to control the engine and represent indications of true mass air flow into the engine at the desired time event and the percentage of total mass flow that is REG. The method is iteratively executed by a computer-based controller.

Structurally, the apparatus of this invention comprises an engine-controller combination including a vehicle engine and means for providing re-circulation of engine exhaust gas. Several sensors determine measures of a set of engine parameters and provide measurement signals indicative of the measures. A microprocessor control unit (i) receives the measurement signals, (ii) predicts future values of MAP and $P_o$, where MAP represents an absolute pressure of an engine intake manifold and where $P_o$ represents a new air partial pressure of the engine intake manifold, and (iii) controls the vehicle engine in response to the predicted future values of MAP and $P_o$.

Use of the present invention to predict manifold pressure and REG in the manifold at the time air and fuel enter the engine cylinder allows precise air-fuel ratio control.

DETAILED DESCRIPTION OF THE INVENTION

In a vehicle intake manifold, during steady state conditions, the manifold absolute pressure is substantially constant and it may be safely assumed that at any given point in time, the mass air flow into the manifold equals the mass air flow out of the manifold. REG control can then be easily determined by measuring the new mass air flow ($MAF_n$) into the manifold with a mass air flow sensor and the total mass air flow through the manifold ($MAF_t$) as a function of MAP and air temperature (T). The percent of REG in the manifold is simply $100(1-31 MAF_n/MAF_t)$.

During transient conditions of the engine, however, the intake manifold acts to temporarily "store" air and REG heading into the engine. Since during transient conditions, air flow into the manifold is dynamic in nature and the relation that at a given point in time the mass air flow into the manifold equals the mass air flow out of the manifold no longer necessarily holds true. In such cases, calculation of REG content by the above method is no longer accurate.

Using model-based prediction of future values of MAP and $P_o$, this invention takes into account the dynamic characteristics of the vehicle intake manifold, along with processing and fuel delivery delays to accurately control the engine based on total mass air flow into the engine and the percentage of that mass air flow that is REG.

Figure 1:
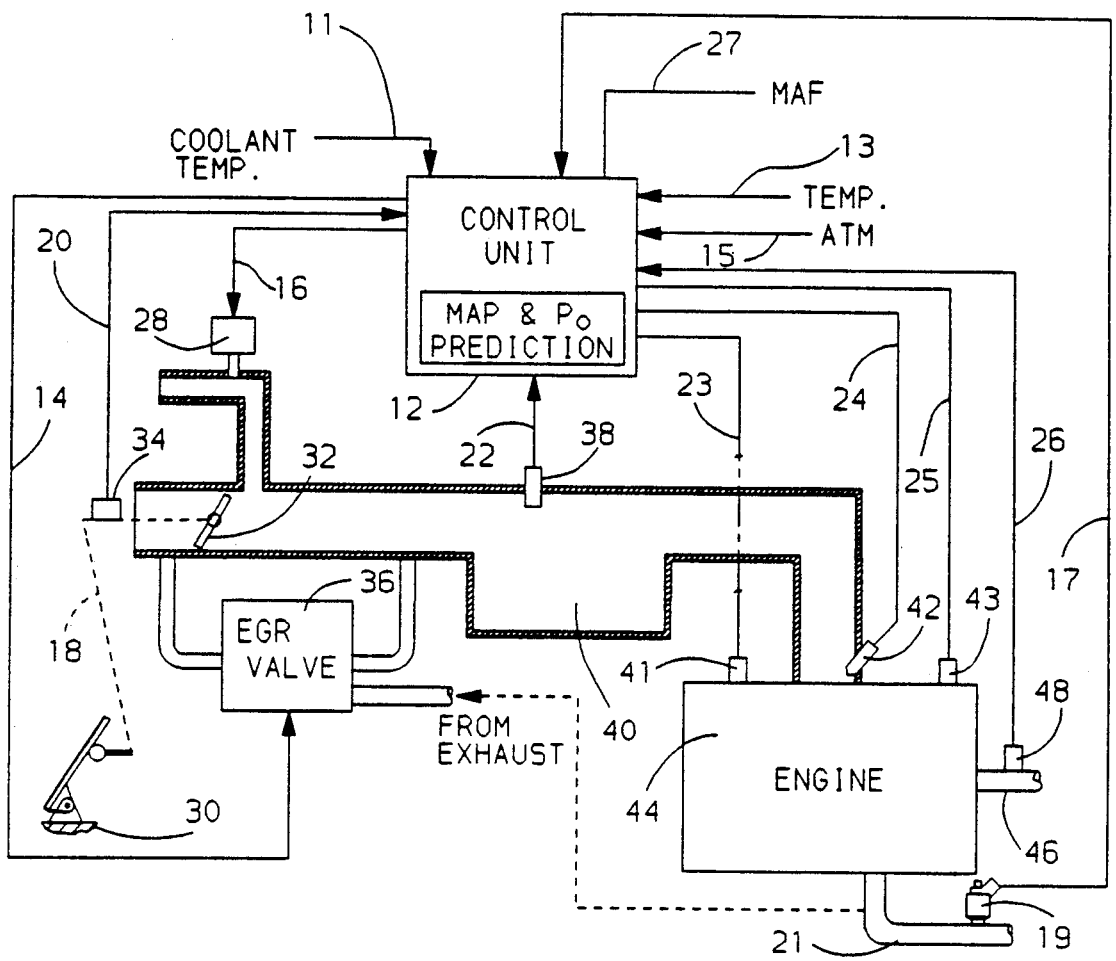
FIG. 1 is a schematic diagram showing an engine assembly, sensors, and control unit in which this invention may be implemented.

Referring to FIG. 1, the engine-powertrain assembly shown includes the engine 44, exhaust manifold 21, fuel injectors 42, spark plugs 41 and 43, air intake manifold 40, throttle 32, exhaust gas re-circulation (EGR) valve 36, and idle air control (IAC) valve 28. The throttle 32 is controlled by accelerator pedal 30 as shown by dotted line 18 and the IAC valve 28, EGR valve 36, spark plugs 41 and 43, and fuel injectors 42 are controlled by controller 12 through lines 16, 14, 23, 25 and 24.

The engine assembly includes means for determining at each time event measures of a set of engine parameters and for providing signals indicative of the measurements to the control unit 12 to be used in the engine state predictions. For example, air temperature (T), atmospheric pressure (ATM) and mass air flow (MAF) are sensed by sensors (not shown) and input into the controller 12 through lines 13, 15 and 27. The positions of the IAC valve 28 (IAC) and the EGR valve (EGR) 36 are determined from the commands on command lines 16 and 14, or they may be measured directly using position sensors (not shown). The throttle position (TPS) and manifold absolute pressure (MAP) are sensed by sensors 34 and 38 and input into the control unit 12 through lines 20 and 22. Engine speed (RPM) is measured through the sensor 48, which detects the rotations of output shaft 46, and input into the control unit 12 through line 26. The engine coolant temperature is sensed by a sensor (not shown) and the oxygen content of the exhaust gas is sensed by sensor 19 and both measurements are input into the control unit 12 through lines 11 and 17. The sensors mentioned above are all standard sensors, a variety of which are readily available to those skilled in the art.

Figure 2:
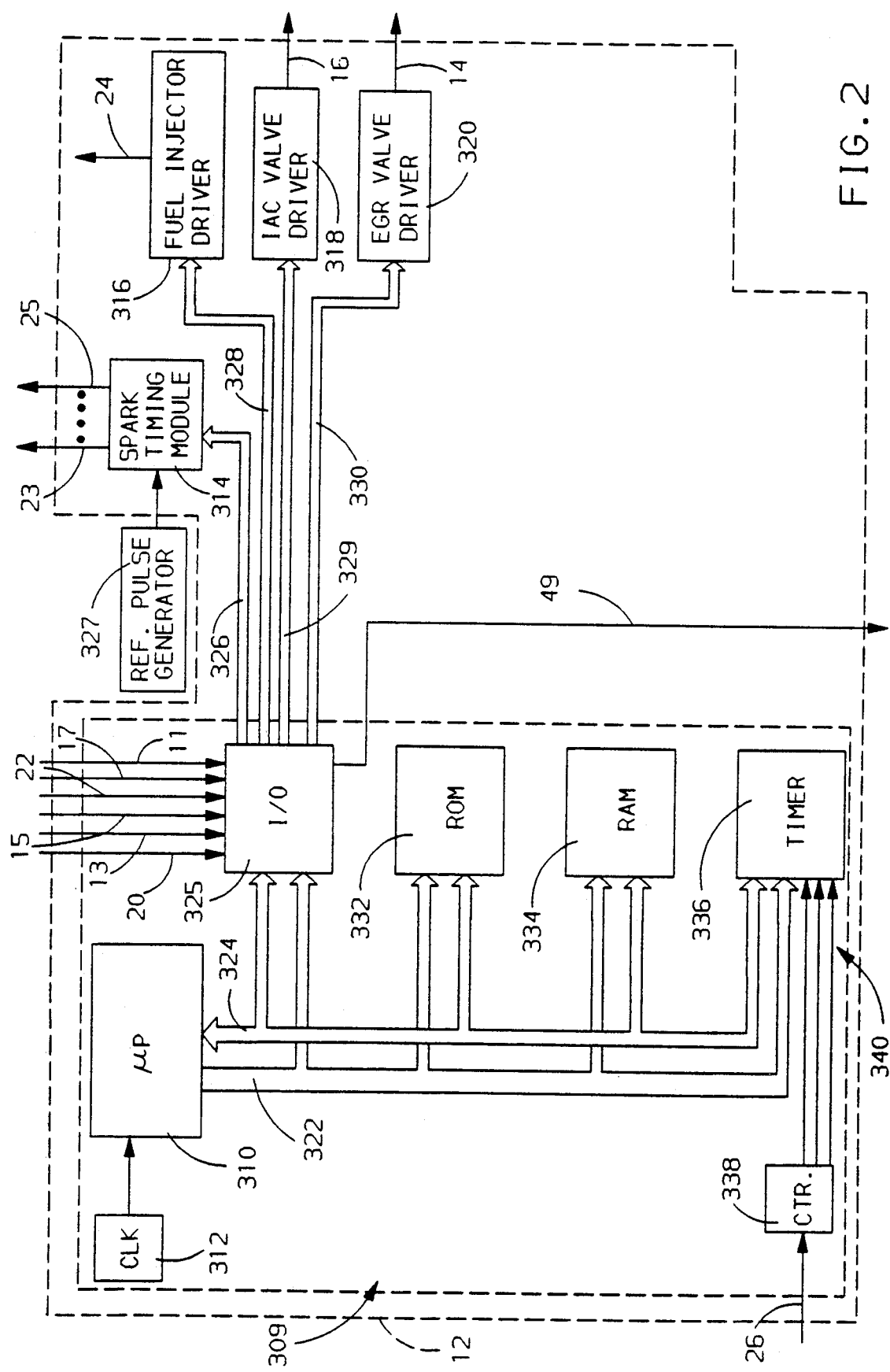
FIG. 2 is an example control unit of the type shown in FIG. 1.

The control unit 12 is a standard control unit easily implemented by one skilled in the art and an example control unit 12 is shown in FIG. 2. The example control unit 12 shown includes microprocessor 310, clock 312, I/O unit 325, interfaces 314, 316, 318 and 320 for controlling engine spark timing, fuel injection, IAC valve position and EGR valve position in response to microprocessor 310. Microprocessor 310 executes an engine control program implementing this invention with standard engine control functions. The control program is stored in ROM 332 and RAM 334 is used for temporary storage of program variables, parameter measurements and other data. Microprocessor 310 sends commands to I/O unit 325, ROM 332, RAM 334 and timer 336 through bus 322 and transfers information between the various units through bi-directional data bus 324.

The I/O unit 325 and the timer unit 336 comprise means for receiving the measurement signals for the measured engine parameters. Engine speed data from sensor 48 is fed, through line 26, to counter 338, which counts the rotations of the engine output shaft 46. The counter 338 provides the count information to timer 336 through lines 340. From the information provided by counter 338 and timer 336, microprocessor 310 can easily compute the engine speed (RPM) and store the information in RAM 334. Various other input signals are provided through the I/O unit 325. Equivalent functions to those of microprocessor 310, I/O unit 325, ROM 332, RAM 334 and timer 336, all shown within box 309, can be performed by a single chip microcomputer, such as Motorola ™ microcomputer No. MC68HC11.

Spark timing and dwell commands may be determined by the microprocessor 310 (in accordance with this invention as described below) and those commands are provided to a standard spark timing module 314 through bus 326. Spark timing module 314 also receives engine position reference signals from a standard reference pulse generator 327 and controls the engine spark plugs through lines 23-25.

Buses 328, 329 and 330 provide commands from microprocessor 310 to interface units 316, 318 and 320, which are standard drivers for the engine fuel injection, idle air control valve and exhaust gas re-circulation valve.

This invention provides predicted values for manifold absolute pressure (MAP) and what the manifold absolute pressure would be without re-circulated exhaust gas ($P_o$), and uses these predictions to control the vehicle engine. For example in place of the measured value of MAP used in a conventional fueling control, the controller can develop a command responsive to predictions of MAP and $P_o$ for improved powertrain control. The controller can also determine, responsive to MAP and $P_o$, the REG content of the intake manifold and provide therefrom closed loop control of EGR valve position.

In one implementation of the invention, the control unit determines the measures of the engine parameters such as EGR valve position, IAC valve position, manifold pressure, engine speed, temperature, and atmospheric pressure and uses the measurements to determine accurate predictions of MAP and $P_o$ at the time air and fuel enter the engine 44. Once accurate predictions of MAP and $P_o$ at the time air and fuel enter the engine 44 are determined, the engine fueling command used to control fuel injectors 42 can be scheduled based on accurate indications of the amount of fresh air and recirculated exhaust gas entering the engine so that a proper air-fuel ratio enters the engine 44. The predictions of MAP and $P_o$ can also be used together with other engine parameters to determine the ignition timing for spark plugs 41 and 43 and can be used to determine EGR valve position.

Many engines do not have an IAC valve 28, but as will be explained below, its presence is not necessary for the successful implementation of the invention. Furthermore, the specific engine parameters that need to be taken into account for successful implementation of this invention vary depending upon engine design and required accuracy. Typically, at least throttle position and manifold absolute pressure must be taken into account in calculating the predictions. Including other engine parameters in the calculations improves the accuracy of the predictions.

Figure 3:
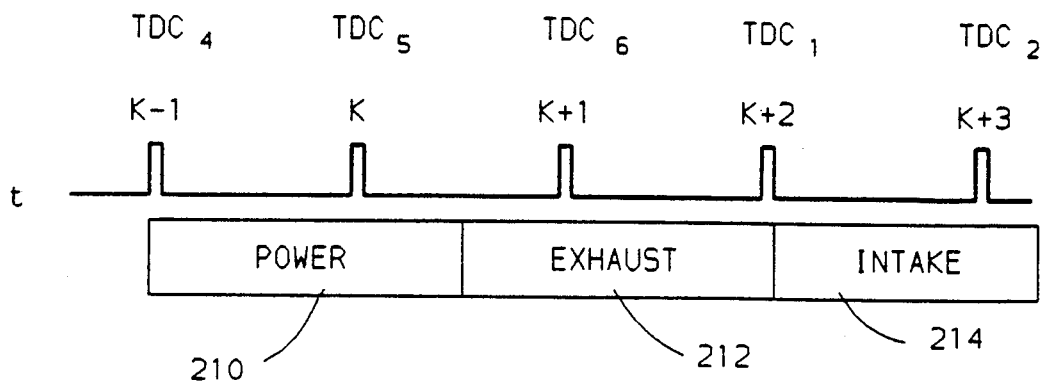
FIG. 3 is a engine timing diagram.

A more detailed description of a typical engine timing scheme can be understood with reference to the timing diagram shown in FIG. 3. The timing diagram shown is for a V6 engine. The times labeled $TDC_4$, $TDC_5$, $TDC_6$, $TDC_1$, and $TDC_2$ correspond to the times when the fourth, fifth, sixth, first, and second cylinders achieve top dead center exhaust position, respectively. In the example shown, each cylinder achieves the top dead center position 120 degrees of engine output shaft rotation after the previous cylinder achieves the top dead center position.

In one implementation, each engine event may correspond to a cylinder achieving top dead center position. For example, if at the present engine event, k, cylinder 5 is at the top dead center position ($TDC_5$), then $TDC_4$ occurred at event $k-1$, $TDC_6$ will occur at event $k+1$, $TDC_1$ will occur at event $k+2$, $TDC_2$ will occur at event $k+3$, etc. Alternatively, any fixed point in the engine cycle may be chosen to correspond to the occurrence of an engine event. Blocks 210, 212, and 214 represent the power stroke, exhaust stroke, and intake stroke, respectively, for cylinder one.

In order to account for the computation and fuel delivery delays, each cylinder's fuel requirement must be calculated when the second preceding cylinder achieves the top dead center position, e.g., the fuel requirement for cylinder one must be calculated at the top dead center position of cylinde five. Using the computation of fuel for cylinder one as an example, the sensor measurements required to calculate the fuel for cylinder one are taken at $TDC_5$, the present engine event k. The fuel and air are delivered to cylinder one during the intake stroke 214.

To compensate for the delays in this V6 system, manifold pressure is ideally predicted somewhere between 2 and 3 engine events in advance. Although in theory an optimal prediction point exists, it is difficult to determine. However, depending upon the characteristics of the system, it may be preferable to approximate and predict manifold pressure based on a weighted average of the predictions 2 and 3 engine events in advance, or in other systems a prediction 2 engine events in the future may be optimal.

Figure 4:
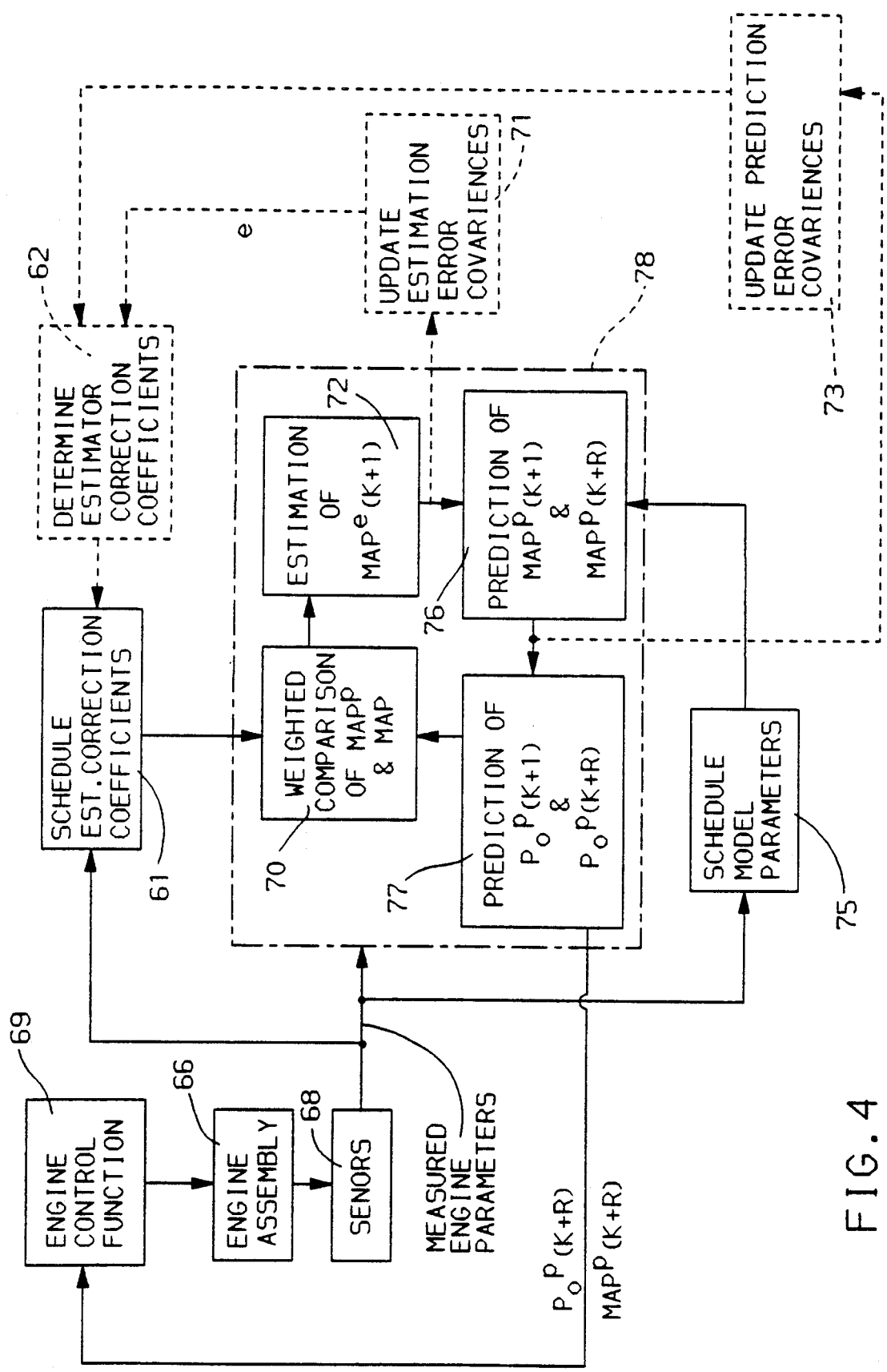
FIG. 4 illustrates the operation of the method and apparatus of this invention.

Implementation of this invention can be further explained with reference to FIG. 4. Block 66 represents the engine assembly whose parameters are measured by sensors 68 and used by the predictor-estimator 78. As can be seen by the arrangement of blocks 70, 72, 76, and 77, the prediction-estimation method operates in a loop.

As will be explained, the prediction-estimation method is a dynamic process whose output depends upon previous measurements and estimations. For this reason, various parameters of the system must be initialized, during vehicle start-up or system reset. After initialization, estimations of manifold absolute pressure, $MAP^e$, (a variable such as MAP represents the general engine state, a superscript e, such as in $MAP^e$ denotes an estimation of the engine state and a superscript p, such as in $MAP^p$, denotes a prediction of the engine state), are computed through blocks 70 and 72 in response to previously predicted values of MAP, represented by the vector $MX^p(k)$, and a weighted comparison of a previously predicted value of MAP with an actual measured value of MAP. New predictions of MAP at the next engine event and R engine events ahead, $MAP^p(k+1)$ and $MAP^p(k+R)$, are determined at block 76 in response to the estimates at block 72, the measured engine parameters, and a first set of fixed predetermined model parameters.

At step 77, predictions of the manifold absolute pressure that would occur without the presence of re-circulated exhaust gas (also referred to as the new air partial pressure, $P_o$, represented by the set OX) at the next engine event and R engine events ahead, $P_o^p(k+1)$ and $P_o^p(k+R)$, are determined at block 77.

The number of engine events ahead, R, that is used depends on the specific engine system. For example, typical values for R might include 1, 2, 3 and 4 depending upon the specific engine system.

The predictions of MAP and $P_o$ at R engine events in the future, $MAP^p(k+R)$ and $P_o^p(k+R)$, are the desired prediction result. The prediction of MAP at the next engine event, $MX^p(k+1)$, is used in the estimation step to correct for error tendencies in the prediction model. The prediction of $P_o$ at the next engine event, $P_o^p(k+1)$ is used in future predictions steps.

The coefficients used in the weighted comparison in block 70 are predetermined in block 62 in a test vehicle through a statistical optimization process such as Kalman filtering and scheduled, based upon two independent engine parameters, e.g., measured manifold absolute pressure and engine speed, at block 61. After the estimator correction coefficients are retrieved, they are used at block 70 in the weighted comparison of $MAP^p(k)$ and the measured value, $MAP(k)$. The weighted comparison may be done either as a separate step from determining the estimations or as part of the estimation determination step. The weighted comparison for the example where manifold absolute pressure is predicted can be described as the following function:

$$G_f(MX^{err}),$$

where $MX^{err} = MAP(k) - MAP^p(k)$. The model parameters are predetermined through statistical reduction of data taken from a test vehicle and scheduled at box 75.

Both the model parameters and correction coefficients are fixed and predetermined in a test vehicle. Because of the nonlinearity of the engine, the model parameters and correction coefficients are scheduled. The predetermination of the parameters and correction coefficients along with the scheduling of the same allows for the control system to have fast response to changing engine states. For example, when the engine changes states, new model parameters and correction coefficients are quickly looked up from computer memory or interpolated from values in computer memory, eliminating the need for adaptive predictions and the slower response time accompanying adaptive systems (typically at least 200-300 events).

Figure 5:
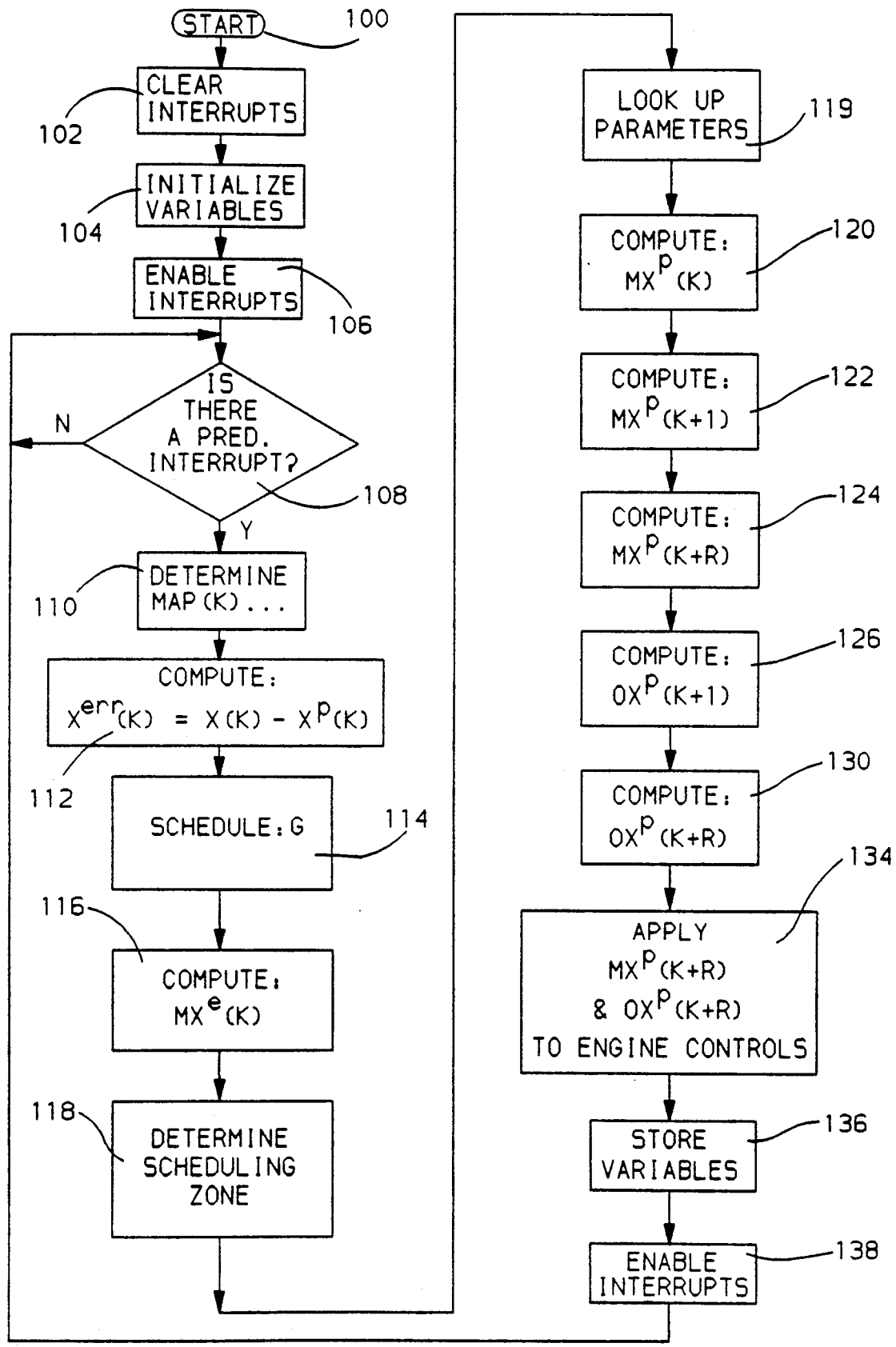
FIGS. 5, 6, 7a and 7b are flow diagrams for computer implementations of this invention.

FIG. 5 represents a computer flow diagram of a generic implementation of this invention to predict manifold absolute pressure (MAP) and the manifold absolute pressure that would occur if there were no re-circulated exhaust gas ($P_o$, new air partial pressure), where MAP(k) is the measure of manifold absolute pressure at time k, $MAP^p(k+R)$ is the prediction of MAP at time $(k+R)$, $P_o{}^p(k+R)$ is the prediction of $P_o$ at time $(k+R)$.

Blocks 100, 102, 104, and 106 startup the system and initialize the variables. At block 108, the system checks for an interrupt signal, which is produced by the engine controller whenever it requires a new prediction. If there is an interrupt, the program proceeds into the prediction-estimation loop starting at block 110, where the first and second sets of engine parameters used in the predictions are determined through input from the measurement means and/or calculation as described above. The sets of engine parameters used in the predictions comprise vectors $U_f(k)$ and $U_o(k)$, where $$U_f(k) = \begin{pmatrix} u_{f1}(k) \\ u_{f2}(k) \\ \cdot \\ \cdot \\ \cdot \\ u_{fe}(k) \end{pmatrix},$$

$$U_o(k) = \begin{pmatrix} u_{o1}(k) \\ u_{o2}(k) \\ \cdot \\ \cdot \\ \cdot \\ u_{oe}(k) \end{pmatrix}, \text{ and}$$

where $u_{f1}(k) \ldots u_{fe}(k)$ are the past and present engine parameter measurements used for prediction of MAP and $u_{o1}(k) \ldots u_{oe}(k)$ are the past and present engine parameter measurements used for prediction of $P_o$. For example, $u_{f1}(k) = TPS(k)$, $u_{f2}(k) = TPS(k-1)$, etc., and $u_{o1}(k) = TPS(k)$, $u_{o2}(k) = TPS(k-1)$, etc., where TPS(k) is a measure of throttle position at event k and TPS(k-1) is a measure of throttle position at event k-1.

At block 112, the computer computes a value for predicted state error, $MX^{err}$. At block 114 the estimator correction coefficients are scheduled and retrieved.

The estimator correction coefficients may be represented by a vector G, such that:

$$G = \begin{pmatrix} G_j \\ G_{j-1} \\ \cdot \\ \cdot \\ \cdot \\ G_0 \end{pmatrix}$$

Implementation of statistical optimization of the estimator correction coefficients reveals that the coefficients G for a given engine operating point eventually achieve a virtual steady state. This allows the determination of G to be done off line, e.g., in a test vehicle, and the values for G to be programmed into ROM in the control unit. This method is favorable because the matrix equations required by block 62 (FIG. 4) become very extensive if many variables are used in the model, requiring more computer execution time than would normally be available in a production automotive engine controller.

At block 116, $MX^e(k)$ is computed as:

$$MX^e(k) = MX^p(k) + GMX^{err},$$

where:

$$MX^e(k) = \begin{pmatrix} MAP^e(k-j) \\ MAP^e(k-j+1) \\ \cdot \\ \cdot \\ \cdot \\ MAP^e(k) \end{pmatrix}, \text{ and}$$

$$MX^p(K) = \begin{pmatrix} MAP^p(k-j) \\ MAP^p(k-j+1) \\ \cdot \\ \cdot \\ \cdot \\ MAP^p(k) \end{pmatrix}.$$

and which is equivalent to the series of equations:

$$MAP^e(k-j) = MAP^p(k-j) + G_j MX^{err},$$
$$MAP^e(k-j+1) = MAP^p(k-j+1) + G_{j-1} MX^{err},$$
$$\cdot \quad \cdot$$
$$\cdot \quad \cdot$$
$$MAP^e(k) = MAP^p(k) + G_0 MX^{err}.$$

The computer determines the model parameter schedule zone utilizing two independent engine parameters at block 118. At block 119, the computer looks up the first and second sets of model parameters from ROM memory.

Each of the first and second sets of model parameters used in the prediction step may be described as three different subsets of parameters. The first set of model parameters comprises the subsets $\{a_{f1}, a_{f2}, \ldots a_{fj+1}\}$, $\{c_{f1}, c_{f2}, \ldots c_{fe}\}$, and $\{h_{f1}\}$, and define matrices $A_f$, $B_f$, and $C_t$ and the second set of model parameters comprises the subsets $\{a_{o1}, a_{o2}, \ldots a_{ol+1}\}$, $\{c_{o1}, c_{o2}, \ldots c_{om}\}$, and $\{h_{o1}\}$, and define matrices $A_o$, $B_o$, and $C_o$ as follows:

$$A_t = \begin{pmatrix} 0 & 1 & 0 & \ldots & & 0 \\ 0 & 0 & 1 & 0 & \ldots & \\ . & 0 & 0 & . & & \\ . & . & . & . & 0 & . \\ . & . & . & & 1 & 0 \\ 0 & . & . & . & 0 & 1 \\ a_{t1} & a_{t2} & \ldots & & a_{tj} & a_{tj+1} \end{pmatrix} \begin{matrix} (1) \\ (2) \\ . \\ . \\ . \\ . \\ (j+1) \end{matrix},$$

$$B_t = \begin{pmatrix} 0 & \ldots & & 0 \\ . & & & . \\ . & & & . \\ . & & & . \\ 0 & & & 0 \\ c_{t1} & . & . & c_{t\epsilon} \end{pmatrix} \begin{matrix} (1) \\ (2) \\ . \\ . \\ . \\ . \\ (j+1) \end{matrix}, C_t = \begin{pmatrix} 0 \\ . \\ . \\ . \\ 0 \\ h_{t1} \end{pmatrix},$$

$$A_o = \begin{pmatrix} 0 & 1 & 0 & \ldots & & 0 \\ 0 & 0 & 1 & 0 & \ldots & \\ . & 0 & 0 & . & & \\ . & . & . & . & 0 & . \\ . & . & . & & 1 & 0 \\ 0 & . & . & . & 0 & 1 \\ a_{o1} & a_{o2} & \ldots & & a_{ol} & a_{ol+1} \end{pmatrix} \begin{matrix} (1) \\ (2) \\ . \\ . \\ . \\ . \\ (l+1) \end{matrix},$$

$$B_o = \begin{pmatrix} 0 & \ldots & & 0 \\ . & & & . \\ . & & & . \\ . & & & . \\ 0 & & & 0 \\ c_{o1} & . & . & c_{om} \end{pmatrix} \begin{matrix} (1) \\ (2) \\ . \\ . \\ . \\ . \\ (l+1) \end{matrix}, \text{ and } C_o = \begin{pmatrix} 0 \\ . \\ . \\ . \\ 0 \\ h_{o1} \end{pmatrix}.$$

These sets of model parameters are predetermined through statistical regression of data taken from a test vehicle. The parameters $\{a_{t1}, a_{t2}, \ldots a_{tj+1}\}$, $\{c_{t1}, c_{t2}, \ldots c_{t\epsilon}\}$, and $h_{t1}$ are the gain coefficients for finding $MX^P(k+1)$ and the parameters $\{a_{o1}, a_{o2}, \ldots a_{ol+1}\}$, $\{c_{o1}, c_{o2}, \ldots c_{om}\}$, and $h_{o1}$ are the gain coefficients for finding $OX^P(k+1)$.

The statistical regression process for the first set of model parameters includes running the test vehicle in various states to obtain sets of engine parameter data measurements for each engine event k. For the second set of model parameters, the process includes running a test vehicle with the EGR valve maintained in a closed position so that no exhaust gas recirculates into the manifold. Optimization problems are then set up to find the sets of model parameters ($a_f$'s, $c_f$'s, and $h_f$'s) for each engine state to minimize the following function:

$$\sum_{l=1}^{n-1} [w_1(l)(X(l+1) - X^M(l+1))]^2, \text{ and}$$

where n is the number of data observations for the specific engine state, X is the state (MAP or $P_o$), $w_1(l)$ is a positive weighting constant chosen to improve model fit in critical areas and to ensure statistical integrity of the model and may vary as a function of 1, and where:

$$X^M(l+1) = a_1X(l-j) + a_2X(l-j+1) + \ldots + a_{j+1}X(l) + c_1u_1(l) + c_2u_2(l) + \ldots + c_\epsilon u_\epsilon(l) + h_1.$$

One skilled in the art can easily perform the above statistical regression and determine the model parameters. Therefore the determination of the model parameters will not be set forth in further detail here.

Internal combustion engines are typically nonlinear and the prediction step set forth below is a linear function with different sets of model parameters to approximate the engine at different operating points. The model parameters should therefore be scheduled for accurate predictions. Likewise, as mentioned above, the estimator corrections coefficients, G, should be scheduled. The scheduling may be done with reference to any two independent engine parameters, e.g. engine speed, RPM(k), and manifold pressure, MAP(k).

The scheduling of the model parameters may be done several different ways. One scheduling method is to use single schedules of parameters and estimator correction coefficients over defined ranges. Another scheduling method is to determine the parameters and estimator correction coefficients at different independent parameter engine operating points and to interpolate between the determined parameters to find a different set of parameters and estimator correction coefficients for each engine operating point. With either of these scheduling methods, the parameters may be retrieved from a three dimensional look-up table in computer memory based on engine speed and manifold pressure, or any other two independent engine parameters. Additionally, any other suitable scheduling method may be used.

$MX^P(k)$ is computed at block 120 such that $MX^P(k) = MX^e(k)$. At block 122, $MAP^P(k+1)$ is computed according to the equation:

$$MX^P(k+1) = A_tMX^e(k) + B_tU_t(k) + C_t,$$

where $MAP^P(k+1)$ is the last row of $MX^P(k+1)$.

At block 124, $MAP^P(k+R)$ is computed according to the equation:

$$MX^P(k+R) = \alpha_t MX^e(k) + \beta_t U_t(k) + \gamma_t,$$

where the three matrices $\alpha_t$, $\beta_t$, and $\gamma_t$, are defined as: $\alpha_t = A_t^R$, $\beta_t = A_t^{R-1}B_t + A_t^{R-2}B_t + \ldots + A_tB_t + B_t$, and $\gamma_t = [A_t^{R-1} + A_t^{R-2} + \ldots + A_t + I]C_t$. These matrices are easily determined by one skilled in the art and vary in form as the value for R varies.

At block 126, $P_o^P(k+1)$ is computed according to the equation:

$$OX^P(k+1) = A_oOX^P(k) + B_oU_o(k) + C_o,$$

where $P_o^P(k+1)$ is the last row of $OX^P(k+1)$.

At block 130, $P_o^P(k+R)$ is computed according to the equation:

$$OX^P(k+R) = \alpha_oOX^P(k) + \beta_oU_o(k) + \gamma_o,$$

where the three matrices $\alpha_o$, $\beta_o$, and $\gamma_o$, are defined as: $\alpha_o = A_o^R$, $\beta_o = A_o^{R-1}B_o + A_o^{R-2}B_o + \ldots + A_oB_o + B_o$, and $\gamma_o = [A_o^{R-1} + A_o^{R-2} + \ldots + A_o + I]C_o$.

The MAP$^P$(k+R) and P$_o{}^P$(k+R) are used at block 134 for improved engine control.

At block 136, the computer prepares for the next engine event by storing engine parameters which will be used for the next iteration of the prediction calculation. At block 138 the interrupts are enabled and the program loops back to block 108. The limits on the estimator correction coefficients scheduled at block 114 are as described below.

Figure 6:
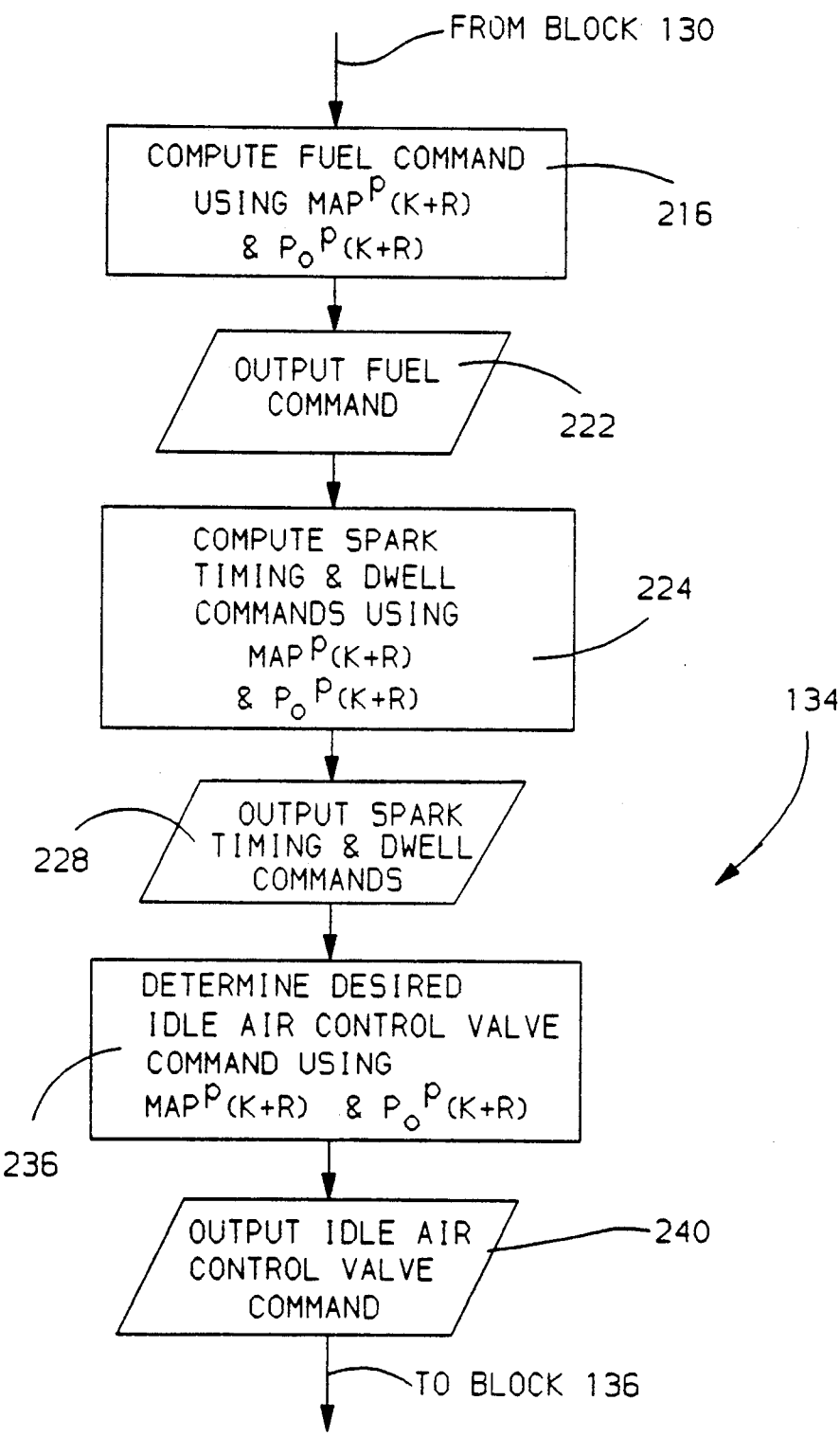

Referring to FIG. 6, block 216 illustrates that this invention may be implemented with typical fuel control, such as speed-density fuel control, using the predicted values to determine the fuel command. For example, MAP$^P$(k+R) and P$_o{}^P$(k+R) may be used with a three dimensional look-up table to output a value that may be substituted in place of measured MAP, which is conventionally used. Such substitution provides improved air-fuel ratio control because the predicted values comprise a more accurate indication of manifold absolute pressure and the re-circulated exhaust gas component at the time the cylinder is actually fueled.

At block 222, the fuel command determined at block 216 using the predicted states is output to control the engine fuel injection in a conventional manner well-known to those skilled in the art.

Block 224 illustrates that this invention may be implemented with typical spark control using predictions, MAP$^P$(k+R) and P$_o{}^P$(k+R), similarly to how the predictions are used for air-fuel ratio control. At block 228, the spark timing and dwell commands are output to a standard engine spark timing control module to control engine spark timing.

Block 236 illustrates that this invention may also be implemented with typical idle air control valve control using predictions, MAP$^P$(k+R) and P$_o{}^P$(k+R), similarly to how predictions are used for air-fuel ratio control. At block 240, the idle air control valve command is output to control the engine idle air control valve in a manner well-known to those skilled in the art.

The above example engine controls may be easily implemented by those skilled in the art without further elaboration herein. Furthermore, the above engine control examples are not the only engine controls with which this invention may be implemented.

Referring again to FIG. 4, blocks 62, 71, and 73 represent one method of how the estimator correction coefficients G may be predetermined in a test vehicle: Kalman filtering.

After the model parameters are found, the invention is implemented in a control system in the test vehicle in a similar manner as explained above. The difference is that blocks 62, 71, and 73 are added to the control routine for computing the estimator correction coefficients, which are now a function of time and will be represented by the vector G(k) where:

$$G(k) = \begin{pmatrix} G_j(k) \\ G_{j-1}(k) \\ \cdot \\ \cdot \\ \cdot \\ G_0(k) \end{pmatrix}$$

After each estimation, the estimation error covariances (error variances dependent upon multiple variables) are updated at block 71 and after each prediction, the prediction error covariances are updated at block 73. Based upon the estimation and prediction error covariances, the correction coefficients are updated at block 62. The correction coefficients are then sorted into schedules based upon two independent engine parameters.

More particularly, during initialization of the system, variables representing the desired state measurement error variance, $\Gamma$, and the process noise covariance, Q, are input into the controller. One example for the matrix Q is:

$$Q = \begin{pmatrix} q_1 & 0 & \ldots & & 0 \\ 0 & q_2 & & & \cdot \\ \cdot & 0 & \cdot & & \cdot \\ \cdot & & \cdot & & \cdot \\ \cdot & & & \cdot & 0 \\ 0 & 0 & \ldots & 0 & q_{j+1} \end{pmatrix},$$

where: $q_1 = q_2 = \ldots = q_{j+1} =$ error variance of the desired state model computed in the above mentioned statistical reduction of data used to determine the model parameters. In general, Q may be any positive semi-definite matrix. One choice for $\Gamma$ is the noise from A/D conversion quantization error.

At block 62, G(k) is computed according to the equation:

$$G(k) = Z(k)L^T(LZ(k)L^T + \Gamma)^{-1},$$

where Z(k) is the state prediction error covariance at time k, L a matrix such that:

$$L = [0 \ldots 1],$$

with the "1" in the (j+1)st position of the matrix, and where $L^T$ (a column matrix with all zeros except for a "1" in the (j+1)st position) is the transpose of L. At block 72, MX$^e$(k) is computed using G(k), such that:

$$MX^e(k) = MX^p(k) + G(k)(MSP(k) - MAP^p(k)).$$

At block 71, the state estimator error covariance S(k) is updated where:

$$S(k) = (I - G(k)L)Z(k),$$

where I is the following identity matrix:

$$I = \begin{pmatrix} 1 & 0 & \ldots & & 0 \\ 0 & 1 & & & \cdot \\ \cdot & & \cdot & & \cdot \\ \cdot & & & \cdot & \cdot \\ \cdot & & & \cdot & 0 \\ 0 & \ldots & & 0 & 1 \end{pmatrix} \begin{matrix} (1) \\ (2) \\ \cdot \\ \cdot \\ \cdot \\ (j+1) \end{matrix}$$

The prediction step at box 76, where MX$^p$(k+1) is computed is the same as explained above. At block 73, the state prediction error covariance Z(k) is updated such that:

$$Z(k+1) = A_t S(k) A_t^T + Q.$$

where $A_t^T$ is the transpose of $A_t$.

Running the test vehicle in an engine operating range around a particular engine operating point for several seconds, e.g., 1000 cycles, will result in stabilization of vector G(k) for that particular engine operating range. The vector G for that particular engine operating range can then be set equal to G(k), where k=1000.

Kalman filtering is only one method of determining G. Any group of constants that tend to lessen the error in the estimates can be chosen for G. The limitation for the system is that the roots of the polynomial f(z), described below, must be within the unit circle. The polynomial f(z) is the determinant of a matrix M, defined as:

$$M = zI - A_t + GLA_t.$$

It should be noted that any of the engine parameters may be treated as time function variables. In other words, the present and past values of any of the engine parameters may be used, but the balance between simplicity and accuracy favors the specific implementations set forth herein. It is also noted that with reference to the above described illustration, one skilled in the art can easily alter the vehicle parameters taken into account in the predictions by adding and/or removing different vehicle parameter measurements to and from the vectors $U_f(k)$ and $U_o(k)$ and altering the model parameter matrices $A_t$, $B_t$, $C_t$, $A_o$, $B_o$ and $C_o$ to take these different vehicle parameters into account.

EXAMPLE 1

Referring again to FIG. 5, in a preferred implementation of the invention MAP and $P_o$ are predicted two engine events in the future, e.g., R=2. This implementation takes into account engine speed, atmospheric pressure and the IAC and EGR valve positions. The measured engine parameters may be described by vectors $U_f(k)$ and $U_o(k)$ as:

$$U_f(k) = \begin{pmatrix} TPS(k) \\ TPS(k-1) \\ \vdots \\ TPS(k-e) \\ RPM(k) \\ RPM(k-1) \\ \vdots \\ RPM(k-s) \\ IAC(k) \\ EGR(k) \\ T(k) \\ ATM(k-1) \\ \vdots \\ ATM(k-g) \end{pmatrix}.$$

$$U_o(k) = \begin{pmatrix} TPS(k) \\ TPS(k-1) \\ \vdots \\ TPS(k-e) \\ RPM(k) \\ RPM(k-1) \\ \vdots \\ RPM(k-s) \\ IAC(k) \\ T(k) \\ ATM(k-1) \\ \vdots \\ ATM(k-g) \end{pmatrix}.$$

This example sets: e=3, g=0, j=3, s=3 and l=3. At block 110, MAP(k), RPM(k), TPS(k), IAC(k), EGR(k), T(k), and ATM(k) are determined. At block 112, $X^{err}$ is manifold pressure error, $MAP^{err}$, where $MAP^{err} = MAP(k) - MAP^p(k)$. At block 116, $MAP^e(k)$, $MAP^e(k-1)$, $MAP^e(k-2)$, and $MAP^e(k-3)$ comprising $MX^e(k)$ are computed with the equations:

$$MAP^e(k) = MAP^p(k) + G_0 MAP^{err},$$

$$MAP^e(k-1) = MAP^p(k-1) + G_1 MAP^{err},$$

$$MAP^e(k-2) = MAP^p(k-2) + G_2 MAP^{err},$$

$$MAP^e(k-3) = MAP^p(k-3) + G_3 MAP^{err}.$$

At block 118, the model parameter schedule zone is determined utilizing RPM(k) and MAP(k). At block 120, $MAP^p(k)$, $MAP^p(k-1)$ and $MAP^p(k-2)$ are computed such that $MAP^p(k) = MAP^e(k)$, $MAP^p(k-1) = MAP^e(k-1)$, and $MAP^p(k-2) = MAP^e(k-2)$. At block 122, $MAP^p(k-1)$ is computed according to the equation:

$$MAP^p(k+1) = a_{t1}MAP^e(k-3) + a_{t2}MAP^e(k-2) +$$
$$a_{t3}MAP^e(k-1) + a_{t4}MAP^e(k) + c_{t1}TPS(k) + c_{t2}TPS(k-1) +$$
$$c_{t3}TPS(k-2) + c_{t4}TPS(k-3) + c_{t5}RPM(k) +$$
$$c_{t6}RPM(k-1) + c_{t7}RPM(k-2) + c_{t8}RPM(k-3) +$$
$$c_{t9}IAC(k) + c_{t10}EGR(k) + c_{t11}T(k) + c_{t12}ATM(k) + h_{t1},$$

and at block 124, $MAP^p(k+2)$ is computed according to the equation:

$$MAP^p(k+2) = a_{t1}a_{t4}MAP^e(k-3) +$$
$$(a_{t1} + a_{t2}a_{t4})MAP^e(k-2) + (a_{t2} + a_{t3}a_{t4})MAP^e(k-1) +$$
$$(a_{t3} + a_{t4})MAP^e(k) + c_{t1}[1 + a_{t4}]TPS(k) +$$
$$c_{t2}[1 + a_{t4}]TPS(k-1) + c_{t3}[1 + a_{t4}]TPS(k-2) +$$
$$c_{t4}[1 + a_{t4}]TPS(k-3) + c_{t5}[1 + a_{t4}]RPM(k) +$$
$$c_{t6}[1 + a_{t4}]RPM(k-1) + c_{t7}[1 + a_{t4}]RPM(k-2) +$$
$$c_{t8}[1 + a_{t4}]RPM(k-3) + c_{t9}[1 + a_{t4}]IAC(k) +$$
$$c_{t10}[1 + a_{t4}]EGR(k) + c_{t11}[1 + a_{t4}]T(k) +$$

-continued
$$c_{t12}[1 + a_{t4}]ATM(k) + h_{t1}[1 + a_{t4}].$$

At block 126, $P_o(k+1)$ is computed according to the equation:

$$P_o^p(k + 1) = a_{o1}P_o^p(k - 3) + a_{o2}P_o^p(k - 2) +$$
$$a_{o3}P_o^p(k - 1) + a_{o4}P_o^p(k) + c_{o1}TPS(k) + c_{o2}TPS(k - 1) +$$
$$c_{o3}TPS(k - 2) + c_{o4}TPS(k - 3) + c_{o5}RPM(k) +$$
$$c_{o6}RPM(k - 1) + c_{o7}RPM(k - 2) + c_{o8}RPM(k - 3) +$$
$$c_{o9}T(k) + c_{o10}ATM(k) + h_{o1},$$

and at block 130, $P_o^p(k+2)$ is computed according to the equation:

$$P_o^p(k + 2) = a_{o1}a_{o4}P_o^p(k - 3) +$$
$$(a_{o1} + a_{o2}a_{o4})P_o^p(k - 2) + (a_{o2} + a_{o3}a_{o4})P_o^p(k - 1) +$$
$$(a_{o3} + a_{o4})P_o^p(k) + c_{o1}[1 + a_{o4}]TPS(k) +$$
$$c_{o2}[1 + a_{o4}]TPS(k - 1) + c_{o3}[1 + a_{o4}]TPS(k - 2) +$$
$$c_{o4}[1 + a_{o4}]TPS(k - 3) + c_{o5}[1 + a_{o4}]RPM(k) +$$
$$c_{o6}[1 + a_{o4}]RPM(k - 1) + c_{o7}[1 + a_{o4}]RPM(k - 2) +$$
$$c_{o8}[1 + a_{o4}]RPM(k - 3) + c_{o9}[1 + a_{o4}]T(k) +$$
$$c_{o10}[1 + a_{o4}]ATM(k) + h_{t1}[1 + a_{o4}].$$

The parameters stored at block 136 are TPS(k−2), TPS(k−1), TPS(k), RPM(k−2), RPM(k−1), and RPM(k).

Further examples of systems implementing this invention are described below.

EXAMPLE 2

In another example implementation, $U_f(k)$ and $U_o(k)$ are set forth as follows:

$$U_f(k) = \begin{pmatrix} TPS(k) \\ TPS(k-1) \\ \cdot \\ \cdot \\ TPS(k-p) \\ RPM(k) \\ RPM(k-1) \\ \cdot \\ \cdot \\ RPM(k-l) \\ ATM(k) \\ ATM(k-1) \\ \cdot \\ \cdot \end{pmatrix}, \quad U_o(k) = \begin{pmatrix} TPS(k) \\ TPS(k-1) \\ \cdot \\ \cdot \\ TPS(k-p) \\ RPM(k) \\ RPM(k-1) \\ \cdot \\ \cdot \\ RPM(k-l) \\ ATM(k) \\ ATM(k-1) \end{pmatrix},$$

$$\begin{pmatrix} ATM(k-s) \\ IAC(k) \\ T(k) \\ MAF(k) \\ MAF(k-1) \\ \cdot \\ \cdot \\ MAF(k-m) \\ EGR(k) \\ EGR(k-1) \\ \cdot \\ \cdot \\ EGR(k-t) \end{pmatrix} \quad \begin{pmatrix} ATM(k-s) \\ IAC(k) \\ T(k) \\ MAF(k) \\ MAF(k-1) \\ \cdot \\ \cdot \\ MAF(k-m) \end{pmatrix}$$

where p, l, m, s and t are predetermined integers which are system constants, and k is the current engine event. During initialization, the vectors $U_f(k)$, $U_o(k)$ and $MX^p(k)$ are given values of engine parameters typically found during engine idle. These values can be stored in a system ROM.

The system then enters the prediction-estimation loop where it first measures the present engine parameters, here: throttle position, TPS(k), engine speed, RPM(k), atmospheric pressure ATM(k), manifold pressure, MAP(k), IAC valve position, IAC(k), temperature, T(k), mass air flow (i.e. from a mass air flow sensor detecting fresh air flow into the manifold), MAF(k) and EGR valve position, EGR(k), block 110, FIG. 5.

$MAP^{err}$ is determined at block 112 as $MAP(k) - MAP^p(k)$. The estimator correction coefficients are scheduled at block 114, e.g., found from a three dimensional look-up table in ROM based upon two independent engine parameters, preferably engine speed and manifold pressure.

The estimation vector of manifold absolute pressure may be described in vector notation by a vector $MX^e(k)$, e.g., $$MX^e(K) = \begin{pmatrix} MAP^e(k - j) \\ MAP^e(k - j + 1) \\ \cdot \\ \cdot \\ \cdot \\ MAP^e(k) \end{pmatrix}.$$

Block 116 computes vector $MX^e(k)$ according to the following vector equation:

$$MX^e(k) = MX^p(k) + G(MAP(k) - MAP^p(k)),$$

which is equivalent to the series of equations:

$$MAP^e(k-j) = MAP^p(k-j) + G_j(MAP(k) - MAP^p(k)),$$
$$MAP^e(k-j+1) = MAP^p(k-j+1) + G_{j-1}(MAP(k) - MAP^p(k)),$$
$$\cdot$$
$$MAP^e(k) = MAP^p(k) + G_0(MAP(k) - MAP^p(k)).$$

The parameters $\{a_{t1}, a_{t2}, \ldots a_{tj+1}\}$, $\{c_{t1}, c_{t2}, \ldots c_{te+3}\}$, and $h_{t1}$ are the gain coefficients for finding $MAP^p(k+1)$ and comprise vectors $A_t$, $B_t$ and $C_t$, which may also be scheduled with reference to any two independent engine parameters, e.g., engine speed, RPM(k), and manifold absolute pressure, MAP(k). The parameters $\{a_{o1}, a_{o2}, \ldots a_{oj+1}\}$, $\{c_{o1}, c_{o2}, \ldots c_{oe+3}\}$, and $h_{o1}$ are the gain coefficients for finding $P_oP(k+1)$ and comprise vectors $A_o$, $B_o$ and $C_o$, which may also be scheduled with reference to any two independent engine parameters, e.g., engine speed, RPM(k), and manifold absolute pressure, MAP(k).

After the model parameters are retrieved at block 119, the predicted manifold absolute pressures for the next engine event and for the k+R engine event, comprising the vectors $MX^p(k+1)$ and $MX^p(k+R)$, are determined at blocks 122 and 124 according to the following vector equations:

$$MX^p(k+1) = A_t MX^e(k) + B_t U_t(k) + C_t,$$

and $$MX^p(k+R) = \alpha_t MX^e(k) + \beta_t U_t(k) + \gamma_t,$$

which, for $MX^p(k+1)$, is equivalent to the group of equations:

$$MAP^p(k-j+1) = MAP^e(k-j+1),$$
$$MAP^p(k-j+2) = MAP^e(k-j+2),$$
$$\vdots$$
$$MAP^p(k) = MAP^e(k),$$
$$MAP^p(k+1) = a_{t1} MAP^e(k-j) + a_{t2} MAP^e(k-j+1) + \ldots +$$
$$a_{tj+1} MAP^e(k) + c_{t1} TPS(k) + c_{t2} TPS(k-1) + \ldots +$$
$$c_{tp+1} TPS(k) + c_{tp+2} RPM(k-1) + \ldots + c_{tp+l+2} RPM(k) +$$
$$c_{tp+l+3} ATM(k-s) + \ldots + c_{tp+l+s+3} ATM(k) +$$
$$c_{tp+l+s+4} IAC(k) + c_{tp+l+s+5} T(k) + c_{tp+l+s+6} MAF(k-m) +$$
$$\ldots + c_{tp+l+s+m+6} MAF(k) + c_{tp+l+s+m+t+7} EGR(k-t) + \ldots +$$
$$c_{tp+l+s+m+t+7} EGR(k) + h_{t1},$$

and for the last row of $MX^p(k+R)$, is equivalent to the following equation:

$$MAP^p(k+R) = \alpha_{t1} MAP^e(k-j) + \alpha_{t2} MAP^e(k-j+1) +$$
$$\ldots + \alpha_{tj+1} MAP^e(k) + \beta_{t1} TPS(k) + \beta_{t2} TPS(k-1) + \ldots +$$
$$\beta_{tp+1} TPS(k) + \beta_{tp+2} RPM(k-1) + \ldots + \beta_{tp+l+2} RPM(k) +$$
$$\beta_{tp+l+3} ATM(k-s) + \ldots + \beta_{tp+l+s+3} ATM(k) +$$
$$\beta_{tp+l+s+4} IAC(k) + \beta_{tp+l+s+5} T(k) + \beta_{tp+l+s+6} MAF(k-m) +$$
$$\ldots + \beta_{tp+l+s+m+6} MAF(k) + \beta_{tp+l+s+m+t+7} EGR(k-t) + \ldots +$$
$$\beta_{tp+l+s+m+t+7} EGR(k) + \gamma_{t1},$$

where $\alpha_{tf}$ is the element in the last row and f'th column of $\alpha_t$, $\beta_{tf}$ is the element in the last row and f'th column of $\beta_t$, and $\gamma_{t1}$ is the last element in $\gamma_t$.

The predicted manifold absolute pressures that would occur without re-circulated exhaust gas for the next engine event and for the k+R engine event, comprising the vectors $OX^p(k+1)$ and $OX^p(k+R)$, are determined at blocks 126 and 130 according to the following vector equations:

$$OX^p(k+1) = A_o OX^p(k) + B_o U_o(k) + C_o,$$

and $$OX^p(k+R) = \alpha_o OX^p(k) + \beta_o U_o(k) + \gamma_o,$$

which, for $OX^p(k+1)$, is equivalent to the group of equations:

$$P_oP(k-j+1) = P_oP(k-j),$$
$$P_oP(k-j+2) = P_oP(k-j+1),$$
$$\vdots$$
$$P_oP(k) = P_oP(k-1),$$
$$P_oP(k+1) = a_{o1} P_oP(k-j) + a_{o2} P_oP(k-j+1) + \ldots +$$
$$a_{oj+1} P_oP(k) + c_{o1} TPS(k) + c_{o2} TPS(k-1) + \ldots +$$
$$c_{op+1} TPS(k) + c_{op+2} RPM(k-1) + \ldots + c_{op+l+2} RPM(k) +$$
$$c_{op+l+3} ATM(k-s) + \ldots + c_{op+l+s+3} ATM(k) +$$
$$c_{op+l+s+4} IAC(k) + c_{op+l+s+5} T(k) + c_{op+l+s+6} MAF(k-m) +$$
$$\ldots + c_{op+l+s+m+6} MAF(k) + h_{o1},$$

for the last row of $MX^p(k+R)$, is equivalent to the following equation:

$$P_oP(k+R) = a_{o1} P_oP(k-j) + a_{o2} P_oP(k-j+1) + \ldots +$$
$$a_{oj+1} P_oP(k) + \beta_{o1} TPS(k) + \beta_{o2} TPS(k-1) + \ldots +$$
$$\beta_{op+1} TPS(k) + \beta_{op+2} RPM(k-1) + \ldots + \beta_{op+l+2} RPM(k) +$$
$$\beta_{op+l+3} ATM(k-s) + \ldots + \beta_{op+l+s+3} ATM(k) +$$
$$\beta_{op+l+s+4} IAC(k) + \beta_{op+l+s+5} T(k) + \beta_{op+l+s+6} MAF(k-m) +$$
$$\ldots + \beta_{op+l+s+m+6} MAF(k) + \gamma_{o1},$$

where $\alpha_{of}$ is the element in the last row and f'th column of $\alpha_o$, $\beta_{of}$ is the element in the last row and f'th column of $\beta_o$, and $\gamma_{o1}$ is the last element in $\gamma_o$.

Note that if R=1 then $\alpha_t = A_t$, $\beta_t = B_t$, $\gamma_t = C_t$, $\alpha_o = A_o$, $\beta_o = B_o$ and $\gamma_o = C_o$ and, according to the equations above, $MX^p(k+1)$ equals $MX^p(k+R)$ and $OX^p(k+1)$ equals $OX^p(k+R)$. Using predictions of MAP and $P_o$ to determine fuel commands (block 134) offers the benefit of reduced transient fueling errors, resulting in decreased emissions while maintaining high performance driveability.

EXAMPLE 3

Many vehicles with IAC valves do not have position feedback of the IAC valve. In such vehicles the IAC valve position command is used as the measure of IAC valve position, IAC(k). If the IAC valve develops a positional bias error, then a consistent error in the predicted states may occur. A method for estimation and correction of IAC valve position bias error is the subject of U.S. Pat. No. 5,070,849, mentioned above. Relevant portions of the method for estimation and correction of IAC valve position bias errors are also set forth here because implementation of the estimation and correction method may significantly improve the functioning of this invention.

While the engine runs in a steady state, the measures of the various engine parameters remain virtually unchanged from one engine event to the next. Likewise the vectors $U_t(k)$ and $U_o(k)$ remain virtually constant while the engine is in steady state. It can be shown that in the same engine conditions the vectors $MX^p(k)$, $MX^e(k)$ and $OX^p(k)$ also achieve a virtual steady state. In such a steady state condition, if there is an error between the predicted engine state $MAP^p$ and the actual engine state, MAP, it is fairly consistent. Under certain conditions, this error may be attributable to IAC valve positional bias error.

Certain inputs, such as T(k), ATM(k), and RPM(k) are fairly immune to bias error because of the sensor characteristics and/or the sensor information processing in the vehicle control unit. At engine idle, the throttle is in a closed position, so error in throttle position, TPS(k), can be eliminated at idle. If the model parameters, $A_t$, $B_t$, and $C_t$, and the estimator error coefficients, G, are well chosen, they do not cause a consistent error. Once all of the other factors are eliminated, which can be done at idle (a steady state condition), prediction errors can be attributable to IAC valve positional bias error.

The copending patent application mentioned above explains that a quantization of IAC valve position error may be determined as:

$$\delta u^e = (X_{ss} - X^p_{ss})/\omega_r,$$

where $\delta u^e$ is an estimate of the IAC valve bias error, $X_{ss}$ is the steady state value for $X(k)$ at engine idle, $X^p_{ss}$ is the steady state value for $X^p(k)$ at engine idle, and $\omega_r$ is the term in the r'th row (the same row in $U(k)$ in which IAC(k) is in) and the j+1st column of a matrix $\Omega$, defined below. The matrix, $\Omega$, is defined by the equation:

$$\Omega = ((I - A(I - GL))^{-1})B,$$

where the superscript "−1" denotes matrix inverse, I is a $(j+1) \times (j+1)$ identity matrix, and L is a matrix $L = [0\ 0 \ldots 0\ 1]$ with the "1" occurring in the j+1st entry. Once $\delta u^e$ is determined, a corrected value for IAC valve position equal to $(IAC(k) + \delta u^e)$ can be used in vectors $U_f(k)$ and $U_o(k)$ in place of IAC(k) to calculate $MX^p(k+1)$, $MX^p(k+R)$, $OX^p(k+1)$ and $OX^p(k+R)$, nullifying the positional bias error of the IAC valve.

Often, the EGR valve can stick and if its position is not measured directly, can cause a bias error. This source of bias error can also be compensated for, but not at the same time IAC valve error is determined. As mentioned above, during engine idle, IAC valve position error is determined so compensations can be made. During non-idle moderate engine loading, when the IAC valve is locked into a constant position, bias error can be attributed to EGR valve position. In these conditions, the EGR valve position error can be determined and corrected for in the same manner as IAC valve position error is determined and corrected for above.

Figure 7A:
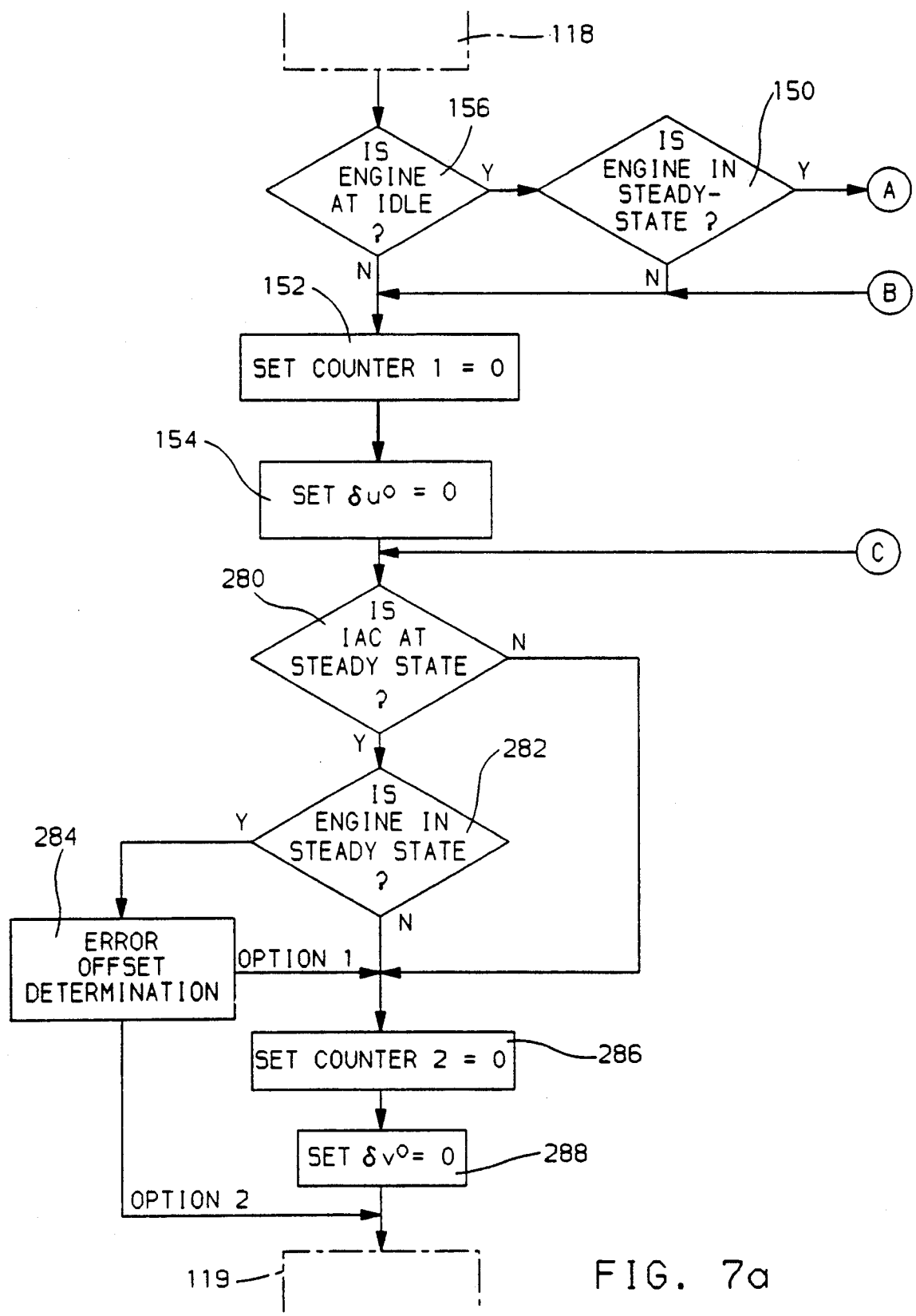
Figure 7B:
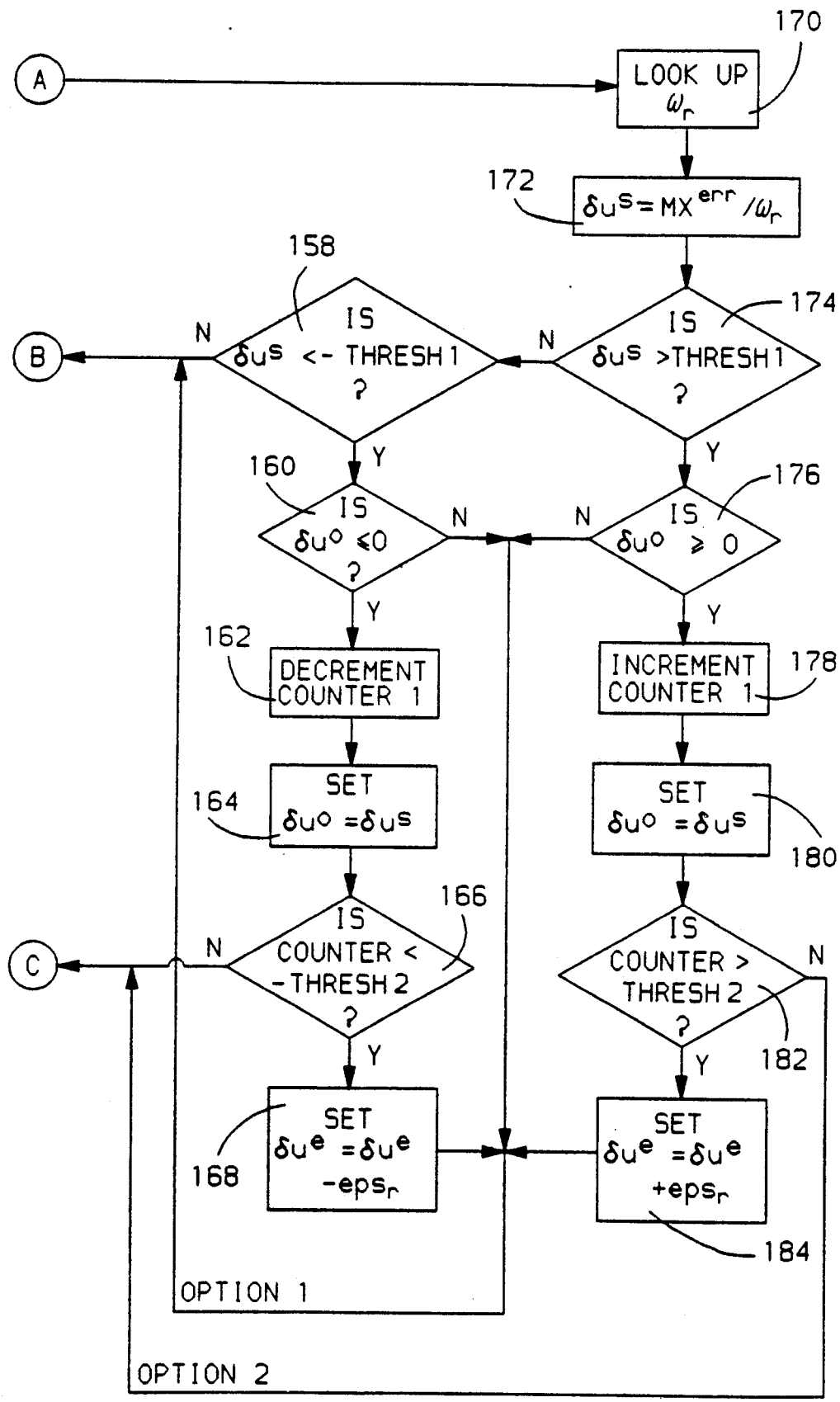

FIG. 7 shows the preferred implementation of the method for estimating and correcting EGR valve position bias errors in the present invention. In the scheme shown, the IAC valve bias error is corrected in small steps, $eps_r$. The decision to take the $eps_r$ step is based on the sign of the bias estimate, $\delta u^e$, the sign of the last bias estimate, and the value of the counter that keeps track of the number of successive times the bias estimates of the same sign exceed a calibrated threshold. This method keeps the value of the sum $(IAC(k) + \delta u^e)$ from wildly varying with every iteration of the routine shown.

More particularly, the routine is implemented between blocks 118 and 119 of FIG. 5, but initialization of the variables required for the routine in FIG. 7 occurs at block 104 in FIG. 5. After the scheduling zone is determined at block 118, block 156 tests to see if the engine is at idle. The engine is at idle if the scheduling zone determined at block 118 is the scheduling zone corresponding to engine idle. If the engine is not at idle, the COUNTER1 is set to zero at block 152, the last bias estimate, $\delta u^o$, is set to zero at block 154, and the computer continues to block 280.

If the engine is found to be at idle at block 156, then block 150 tests to see if the engine is in a steady state. The engine may be said to be in steady state if:

$$TPS(k) \simeq TPS(k-1) \simeq TPS(k-2) \simeq TPS(k-3),$$

$$RPM(k) \simeq RPM(k-1) \simeq RPM(k-2) \simeq RPM(k-3),$$

and $$MAP(k) \simeq MAP(k-1) \simeq MAP(k-2) \simeq MAP(k-3).$$

Other steady state tests may be employed. If the engine is not in a steady state, then the program continues to block 152. If the engine is in a steady state, then the program moves to block 170 where a value for $\omega_r$ is determined from a lookup table in computer memory.

A present IAC valve error estimate, $\delta u^s$, is determined at block 172 according to the equation: $\delta u^s = MX^{err}/\omega_r$. At block 174, the present error estimate is compared to a first threshold (e.g., one increment in IAC valve position command), if the present error estimate is greater than the first threshold then the routine proceeds to block 176, otherwise to block 158. At block 176, the previous error estimate, $\delta u^o$, is compared to zero. If the previous error estimate is less than zero, then the computer jumps to block 152. If the previous error estimate is greater than or equal to zero, then the COUNTER1 is incremented at block 178 and the present error estimate becomes the previous error estimate at block 180.

If the COUNTER1 is not greater than the second threshold (e.g., 8) at block 182, then the computer jumps to block 280. If the COUNTER1 is greater than the second threshold at block 182, then the IAC error correction value, $\delta u^e$, is updated at block 184 so that $\delta u^e = \delta u^e + eps_r$. The computer then moves to block 152.

If, at block 174, the present error estimate was not greater than the first threshold, then it is compared to a negative of the first threshold at block 158. If the present error estimate is not less than a negative of the first threshold at block 158, then the computer jumps to block 152. If the present error estimate is less than a negative of the first threshold at block 158, then the previous error estimate is compared to zero at block 160. If the previous error estimate is greater than zero at block 160, then the computer jumps to block 152. If the previous error estimate is not greater than zero at block 160, then the computer moves to block 162 where the COUNTER1 is decremented and to block 164 where the present error estimate becomes the previous error estimate.

At block 166, the COUNTER1 is compare to a negative of the second threshold. If the COUNTER1 is not less than a negative of the second threshold at block 166, then the computer jumps to block 280. If the COUNTER1 is less than a negative of the second threshold at block 166 then block 168 updates the IAC error correction value, $\delta u^e$, such that $\delta u^e = \delta u^e - eps_r$ and then continues to block 152.

Blocks 280 tests to if the IAC valve is at steady state for determination of EGR valve position error. If the IAC valve is at a steady state and at block 282 the engine is determined to be in a steady state, then at block 284, EGR valve position error is determined and an offset, $\delta v^o$, is calculated in the same manner as IAC valve position error is determined at blocks 158-184.

When an error estimation routine such as the routine in FIG. 7 is implemented with this invention, the computations of $MAP^p(k+1)$, $MAP^p(k+R)$, $P_o^p(k+1)$ and $P_o^p(k+R)$ at blocks 122, 124, 126 and 130 use values equal to the sum (IAC(k)+δu$^e$) in place of IAC(k) and the sum (EGR(k)+δv$^o$) in place of EGR to achieve higher accuracy in the predictions.

Figure 8:
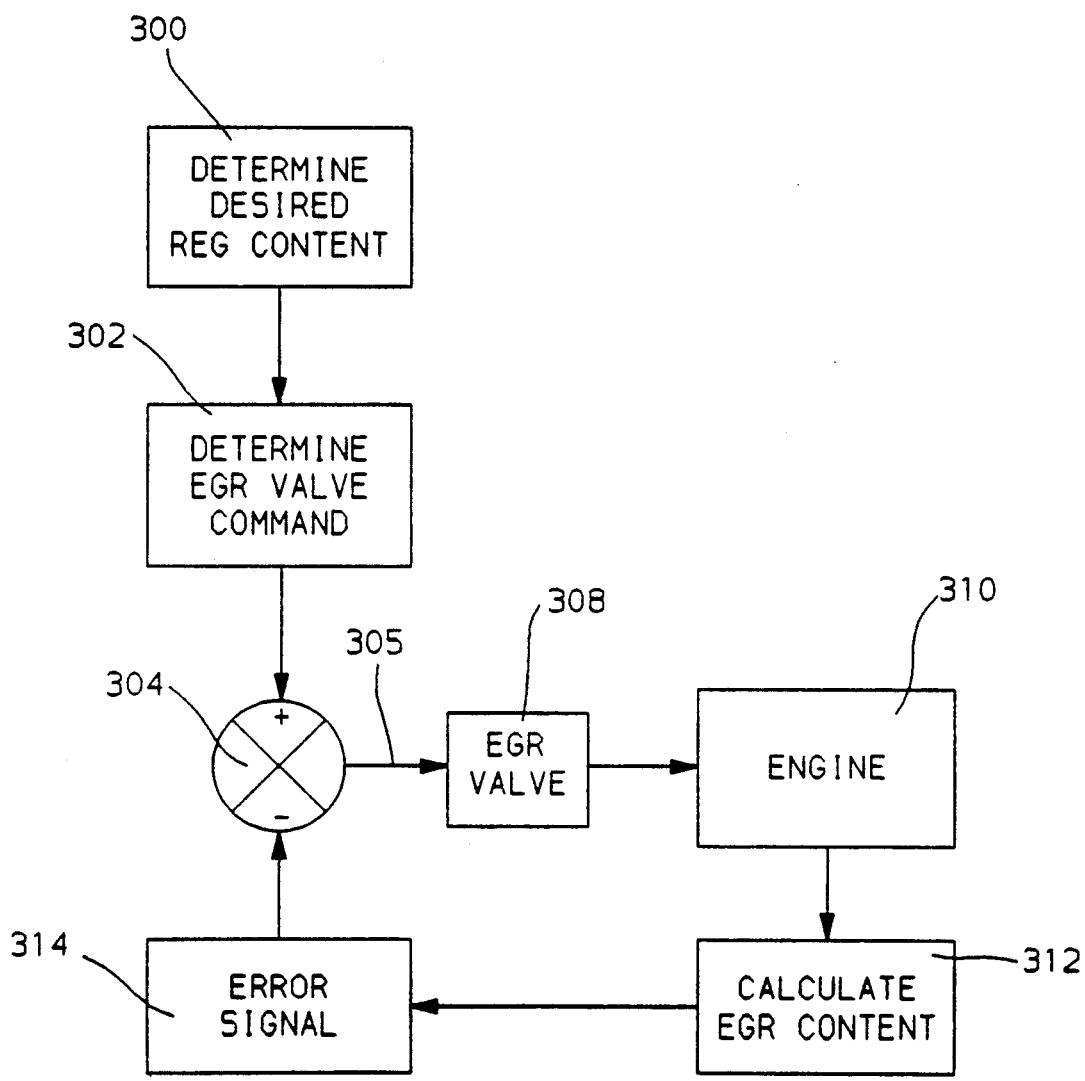
FIG. 8 is a control diagram of closed loop exhaust gas re-circulation control according to this invention.

With increasingly stringent emission requirements, closed loop control of re-circulated exhaust gas content offers better control of re-circulated exhaust gas content and thereby offers better control of emissions. Referring to FIG. 8, this invention provides a closed loop control system for re-circulated exhaust gas content. Blocks 300, 302, 312 and 314 represent control functions performed by the vehicle control unit (e.g., reference 12, FIG. 1), block 308 represents a positional EGR valve and block 310 represents a vehicle engine assembly.

The engine control unit (e.g., reference 12, FIG. 1) determines (block 300) the desired content of re-circulated exhaust gas in the intake manifold of the engine and provides a signal indicative thereof to block 302. In general, the desired re-circulated exhaust gas content is scheduled based on engine speed and air flow into the engine according to a predetermined function for a specific engine, easily achievable by those skilled in the art. Any suitable EGR control scheme is acceptable as this invention is not predicated on any one open-loop command structure.

Block 302 in the control diagram represents an EGR valve command function generator, which, responsive to the signal output by block 300, generates an EGR valve position command. Summation block 304 subtracts the EGR valve position command from the feedback signal generated at block 314 (described below) and outputs the resultant signal on line 305 as a closed loop control signal for EGR valve 308. In response to the closed loop control signal on line 305, EGR valve 308 opens and/or closes, affecting the re-circulation of exhaust gas in engine assembly 310 and thereby affecting the re-circulated exhaust gas content in the intake manifold of engine assembly 310.

Block 312 represents calculation, according to this invention, of the re-circulated exhaust gas content in the intake manifold in response to sensed engine parameters. To calculate the re-circulated exhaust gas content, $MAP^p(k+R)$ and $P_o^p(k+R)$ are determined as explained above. $MAP^p(k+R)$ and $P_o^p(k+R)$ together are indicative of the re-circulated exhaust gas content in the intake manifold. For example, the mass content of re-circulated exhaust gas in the intake manifold is proportional to the percent of absolute pressure in the intake manifold due to the re-circulated exhaust gas (assuming a homogeneous temperature of the gases in the intake manifold). The percent of gases in the intake manifold that are re-circulated exhaust gases, % REG, can be calculated:

$$\%REG = 100((MAP^p(k+R) - P_o^p(k+R))/MAP^p(k+R)).$$

The above calculation need not be done explicitly as the predictions $MAP^p(k+R)$ and $P_o^p(k+R)$ can be input into a function generator, such as a lookup table, to generate a signal relational to % REG. The signal relational to % REG is determined at block 314 and used as the feedback signal input to summation block 304, providing closed loop control of exhaust gas re-circulation for the engine.

In view of the above description, the control system of FIG. 8 can easily be implemented into vehicle apparatus of the type shown in FIGS. 1 and 2 by those skilled in the art.

The above described implementations of this invention are example implementation to which this invention is not limited. Various improvements and modifications to the present invention may occur to those skilled in the art and fall within the scope of the invention as set forth below.

The embodiments of the invention in which an exclusive property or privilege is claimed are defined as follows:

1. A method of controlling a vehicle engine, comprising the steps of:
 predicting a future value of manifold absolute pressure;
 predicting a future value of new air partial pressure; and
 controlling a vehicle engine responsive to the predicted future values of manifold absolute pressure and new air partial pressure.

2. An engine-controller combination, comprising:
 an engine;
 means for re-circulating exhaust gas;
 means for determining, at successive time events, measures of a set of engine parameters and for providing measurement signals indicative of said measures; and
 a microprocessor control unit, including (i) means for receiving the measurement signals, (ii) means for predicting from engine information available at event k future values of MAP and $P_o$ at an event k+R, where R is at least 1, where MAP represents an absolute pressure of an engine intake manifold and where $P_o$ represents a new air partial pressure of the engine intake manifold, and (iii) means for controlling the vehicle engine in response to the predicted future values of MAP and $P_o$, providing improved control of an engine parameter comprising: air-fuel ratio, engine idle speed, engine speed, spark timing, wherein
 the microprocessor control unit iteratively:
 determines an estimation of MAP in response to a present measure of MAP, a prediction of MAP at event k, and a set of fixed predetermined correction coefficients;
 determines the prediction of MAP at an event k+1 in response to information including (i) the measurement signals including signals indicative of the measures of the set of engine parameters at event k and previous events, (ii) the estimation of MAP and (iii) a first set of fixed predetermined model parameters;
 determines the predicted value of MAP at event k+R in response to information including (i) the measurement signals including signals indicative of the measures of the set of engine parameters at event k and previous events, (ii) the estimation of MAP and (iii) the first set of fixed predetermined model parameters, wherein the predicted value of MAP at event k+R is a substantially accurate representation of a value of manifold absolute pressure at event k+R;
 determines a prediction of $P_o$ at an event k+1 in response to information including (i) the measurement signals including signals indicative of the measures of the set of engine parameters at event k and previous events, (ii) previous predictions of $P_o$ and (iii) a second set of fixed predetermined model parameters; and determines the predicted value of $P_o$ at event $k+R$ in response to information including (i) the measurement signals including signals indicative of the measures of the set of engine parameters at event k and previous events, (ii) the previous predictions of $P_o$ and (iii) the second set of fixed predetermined model parameters, wherein the predicted value of $P_o$ at event $k+R$ is a substantially accurate representation of a value of new air partial pressure at event $k+R$.

3. The apparatus of claim 2 wherein the set of engine parameters includes at least two members of a set comprising: manifold absolute pressure, measured mass air flow, predicted mass air flow, idle air control valve position, exhaust gas re-circulation valve position, atmospheric pressure, throttle position, engine speed and air temperature.

4. An engine-controller combination, comprising:
an engine;
means for re-circulating exhaust gas;
means for determining, at successive time events, measures of a set of engine parameters and for providing measurement signals indicative of said measures; and
a microprocessor control unit, including (i) means for receiving the measurement signals, (ii) means for predicting from engine information available at event k future values of MAP and $P_o$ at an event $k+R$, where R is at least 1, where MAP represents an absolute pressure of an engine intake manifold and where $P_o$ represents a new air partial pressure of the engine intake manifold, and (iii) means for controlling the vehicle engine in response to the predicted future values of MAP and $P_o$, providing improved control of an engine parameter comprising: air-fuel ratio, engine idle speed, engine speed, spark timing, wherein
the microprocessor control unit:
initializes a set of variables including the set of engine parameters for events preceding time k; thereafter iteratively:
receives the measurement signals for event k;
determines an error signal in response to a differece between a measure MAP at event k and a prediction of MAP for event k;
schedules a set of fixed predetermined correction coefficients in response to two of the measurement signals representing independent engine parameters;
determines a set of estimated values of MAP in response to the prediction of MAP, the error signal, and the set of fixed predetermined correction coefficients;
schedules first and second sets of fixed model parameters in response to the two measurement signals representing independent engine parameters;
determines the prediction of MAP in response to the measurement signals for event k and preceding events, the set of estimated values, and the first set of fixed predetermined model parameters, the prediction of MAP including a prediction of MAP at engine event $k+1$;
determines a prediction of $P_o$ in response to the measurement signals for event k and preceding events, previous predictions of $P_o$, and the second set of fixed predetermined model parameters, the prediction of $P_o$ including a prediction of $P_o$ at engine event $k+1$; and determines engine control in response to the predictions of MAP and $P_o$.

5. The apparatus of claim 4 wherein the first and second sets of model parameters and the set of correction coefficients are scheduled from look-up tables within control unit memory.

6. The control system of claim 4 wherein the set of engine parameters includes throttle position and engine speed.

7. The control system of claim 6 wherein the set of engine parameters also includes at least one member of a set comprising: manifold absolute pressure, measured mass air flow, predicted mass air flow, idle air control valve position, exhaust gas re-circulation valve position, atmospheric pressure and air temperature.

8. An engine-controller combination, comprising:
a vehicle engine;
an exhaust gas re-circulation valve providing re-circulation of engine exhaust gas;
means for determining measures of a set of engine parameters and for providing measurement signals indicative of said measures; and
a microprocessor control unit, including (i) means for receiving the measurement signals, (ii) means for predicting future values of MAP and $P_o$, where MAP represents an absolute pressure of an engine intake manifold and where $P_o$ represents a new air partial pressure of the engine intake manifold; and (iii) means for controlling the vehicle engine in response to the predicted future values of MAP and $P_o$.

9. The apparatus of claim 8, wherein the controlling means controls fueling of the engine by developing a fuel command in response to the predicted values and outputting the fuel command to a fuel injection control unit, which fuels the engine in response to the fuel command, thereby improving engine air-fuel ratio control.

10. The apparatus of claim 8, wherein the controlling means controls engine spark through spark timing and dwell commands output to a spark timing control module by developing the spark timing and dwell commands in response to the predicted values and outputting the spark timing and dwell commands to the spark timing control module.

11. The apparatus of claim 8, wherein the controlling means controls an idle air control valve through an idle air control valve command by developing the idle air control valve command in response to the predicted values and outputting the idle air control valve command to the idle air control valve.

12. The apparatus of claim 8, wherein the controlling means includes means for developing a fuel command and means for modifying the fuel command responsive to the predicted values R engine events in the future and means for outputting the fuel command to a fuel injection control unit, which fuels the engine in response to the fuel command, thereby improving engine air-fuel ratio control.

13. The apparatus of claim 8, wherein the microprocessor control unit iteratively:
(i) predicts future values of MAP in response to (a) the measurement signals, (b) a first linear model comprising a first set of fixed predetermined model parameters, and (c) an estimation set including at least one estimated value MAP,
(ii) determines the estimation set in response to (a) a present measure of the desired engine state, (b) the predicted future values of MAP, and (c) a correction set of fixed predetermined correction coefficients wherein the predicted value of MAP is a substantially accurate prediction of MAP, and (iii) predicts future values of $P_o$ in response to (a) the measurement signals and (b) a second linear model comprising a second set of fixed predetermined model parameters.

14. The apparatus of claim 13 wherein the correction coefficients are predetermined through Kalman filtering.

15. The apparatus of claim 8 wherein the set of engine parameters includes throttle position and engine speed.

16. The apparatus of claim 15 wherein the set of engine parameters also includes at least one member of a set comprising: manifold absolute pressure, measured mass air flow, predicted mass air flow, idle air control value position, exhaust gas re-circulation valve position, atmospheric pressure and air temperature.

17. The apparatus of claim 8 wherein the predicted values of MAP and $P_o$ include (i) predicted values of MAP and $P_o$ for one engine event in the future and (ii) predicted values of MAP and $P_o$ for R engine events in the future, where R is at least 1 and wherein the controlling means controls the vehicle engine in response to the predicted value of the desired engine state for R engine events in the future.

18. The apparatus of claim 17, wherein the controlling means controls fueling of the engine by developing a fuel command in response to the predicted values R engine events in the future and outputting the fuel command to a fuel injection control unit, which fuels the engine in response to the fuel command, thereby improving engine air-fuel ratio control.

19. The apparatus of claim 17, wherein the controlling means controls engine spark through spark timing and dwell commands output to a spark timing control module by developing the spark timing and dwell commands in response to the predicted values R engine events in the future and outputting the spark timing and dwell commands to the spark timing control module.

20. The apparatus of claim 17, wherein the controlling means controls an idle air control valve through an idle air control valve command by developing the idle air control valve command in response to the predicted values R engine events in the future and outputting the idle air control valve command to the idle air control valve.

21. The apparatus of claim 17, wherein:
the predicted values of MAP for a given engine event comprises a vector $MX^p(k)$ where k is the present engine event, the measures of the set of engine parameters comprise a vector $U_t(k)$, the estimation set comprises a vector $MX^e(k)$, and the first set of fixed predetermined model parameters comprises matrices $A_t$, $B_t$, and $C_t$, the predicted value of MAP for one engine event in the future being determined by a relation:

$$MX^p(k+1) = A_t MX^e(k) + B_t U_t(k) + C_t,$$

and the predicted value of MAP for R engine events in the future being determined by:

$$MX^p(k+R) = A_t^R MX^e(k) + [A_t^{R-1} B_t + A_t^{R-2} B_t + \ldots + A_t B_t + B_t] U_t(k) + [A_t^{R-1} + A_t^{R-2} + \ldots + A_t + I] C_t;$$

and
the correction set comprises a vector G, and $MAP^p(k)$ and $MAP(k)$ represent predicted and measured values of MAP at event k, respectively, the estimation set being determined by a relation:

$$MX^e(k) = MX^p(k) + G(MAP(k) - MAP^p(k));$$

and wherein,
the predicted values of $P_o$ for a given engine event comprises a vector $OX^p(k)$ where k is the present engine event, the measures of the set of engine parameters comprise a vector $U_o(k)$, and the second set of fixed predetermined model parameters comprises matrices $A_o$, $B_o$, and $C_o$, the predicted value of $P_o$ for one engine event in the future being determined by a relation:

$$OX^p(k+1) = A_o OX^p(k) + B_o U_o(k) + C_o,$$

and the predicted value of $P_o$ for R engine events in the future being determined by:

$$OX^p(k+R) = A_o^R OX^p(k) + [A_o^{R-1} B_o + A_o^{R-2} B_o + \ldots + A_o B_o + B_o] U_o(k) + [A_o^{R-1} + A_o^{R-2} + \ldots + A_o + I] C_o.$$

22. The apparatus of claim 21 wherein the first and second sets of model parameters are predetermined through statistical regression.

23. The apparatus of claim 21 wherein the first and second sets of model parameters are scheduled according to two independent engine variables.

24. The apparatus of claim 21 wherein the correction coefficients are predetermined through Kalman filtering.

25. The apparatus of claim 21 wherein the set of engine parameters includes throttle position and engine speed.

26. The apparatus of claim 25 wherein the set of engine parameters also includes at least one member of a set comprising: manifold absolute pressure, measured mass air flow, predicted mass air flow, idle air control valve position, exhaust gas re-circulation valve position, atmospheric pressure and air temperature.

* * * * *